United States Patent [19]

Muramatsu et al.

[11] Patent Number: 5,461,459
[45] Date of Patent: Oct. 24, 1995

[54] DIGITAL COPYING APPARATUS CAPABLE OF FORMING A BINDING AT AN APPROPRIATE POSITION

[75] Inventors: Hideo Muramatsu, Shinshiro; Kaoru Tada, Aichi, both of Japan

[73] Assignee: Minolta Co., Ltd., Osaka, Japan

[21] Appl. No.: 282,619

[22] Filed: Jul. 29, 1994

[30] Foreign Application Priority Data

Aug. 2, 1993 [JP] Japan ................................ 5-210868

[51] Int. Cl.⁶ .................................................. G03G 21/14
[52] U.S. Cl. .......................... 355/203; 355/218; 355/324; 358/448; 358/452; 412/1; 412/11; 382/296
[58] Field of Search ..................... 355/218, 324, 355/203, 204, 208; 412/1, 9, 11; 358/448, 452; 382/46

[56] References Cited

U.S. PATENT DOCUMENTS

| | | | |
|---|---|---|---|
| 4,591,884 | 5/1986 | Miyamoto et al. | 346/153.1 |
| 5,077,811 | 12/1991 | Onda | 382/46 |
| 5,301,036 | 4/1994 | Barrett et al. | 358/448 |
| 5,343,304 | 8/1994 | Nakai et al. | 358/296 |
| 5,383,754 | 1/1995 | Sumida et al. | 412/11 |

*Primary Examiner*—R. L. Moses
*Attorney, Agent, or Firm*—Willian Brinks Hofer Gilson & Lione

[57] ABSTRACT

A digital copying apparatus capable of forming a binding at an appropriate position with respect to a copy image irrespective of an orientation of an original document. The digital copying apparatus detects orientations of the original document, an original image and a copy sheet, and rotates original image data in accordance with the detected orientations so as to accord the orientations of the original image and a copy image. When the rotated original image data is formed on the copy sheet as the copy image, formation of the copy image is controlled to provide a binding at the relative position in relation to the copy image by shifting the copy image with respect to the copy sheet.

11 Claims, 29 Drawing Sheets

(UD signal is non-active)

shift amount = 0            shift amount = As

FIG.15

| BUFFER address | FST_WHT | LST_WHT |
|---|---|---|
| 0 | 0 | 0 |
| 1 | 0 | 0 |
| ⋮ | ⋮ | ⋮ |
| k-1 | 0 | 0 |
| k | first data other than 0 | first data other than 0 |
| ⋮ | ⋮ | ⋮ |
| l | minimum value of FST_WHT | * |
| ⋮ | ⋮ | ⋮ |
| m | * | maximum value of LST_WHT |
| ⋮ | ⋮ | ⋮ |
| n | last data other than 0 | last data other than 0 |
|  | 0 | 0 |
|  | 0 | 0 |
| ⋮ | ⋮ | ⋮ |

FIG. 16

| page | longitudinal length of document | lateral length of document |
|---|---|---|
| 1 | 297 | 210 |
| 2 | 210 | 297 |
| 3 | 364 | 257 |
| ⋮ | ⋮ | ⋮ | code memory

| | |
|---|---|
| 0 | code data 1 of page 1 |
| 32K | code data 2 of page 1 |
| 64K | code data 2 of page 1 |
| 96K | code data 2 of page 2 |
| 128K | |

| area | page | forward link | backward link | additional info. |
|---|---|---|---|---|
| 0 0 | 1 | 0 0 | 0 1 | |
| 0 1 | 1 | 0 1 | F F | |
| 0 2 | 2 | 0 0 | 0 3 | |
| 0 3 | 2 | 0 3 | F F | |
| ⋮ | | | | |

FIG. 20
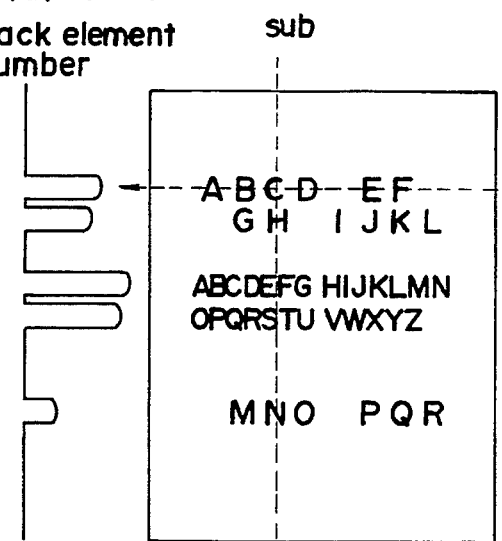
(a) P-1
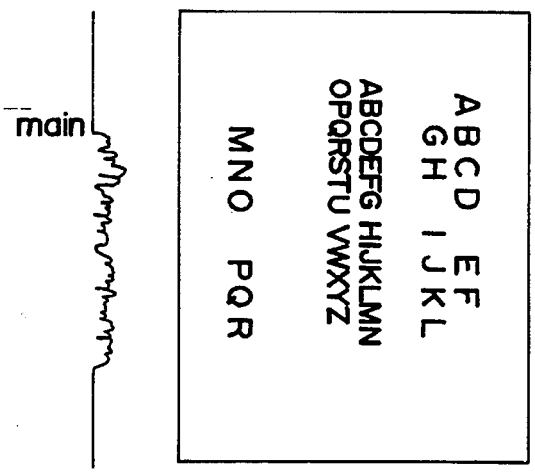
(c) L-1
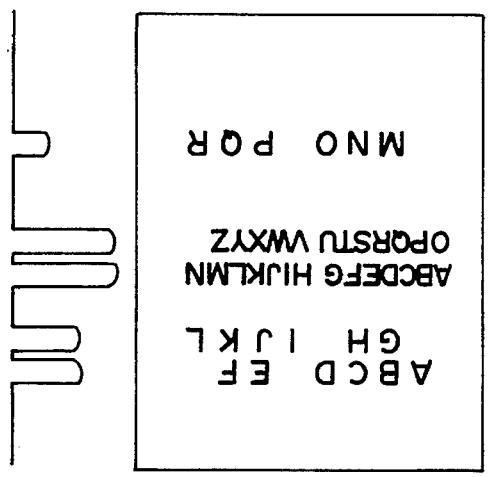
(b) P-2
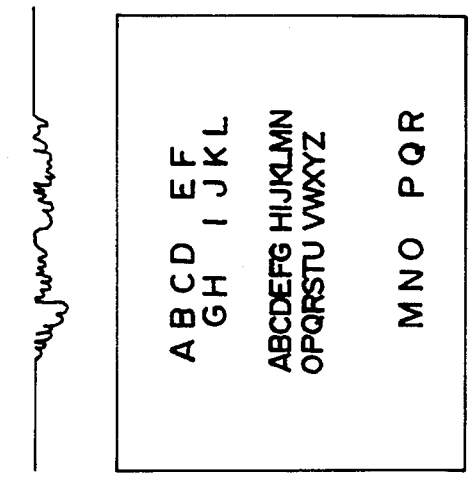
(d) L-2

FIG.21
(a) P-1
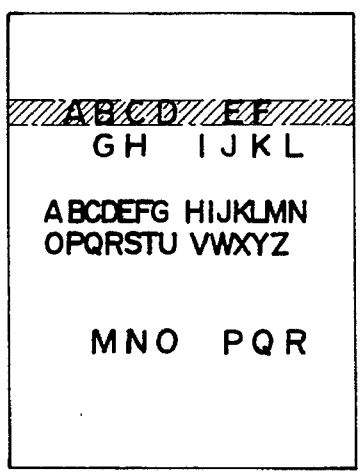
black element
number
(b) P-2
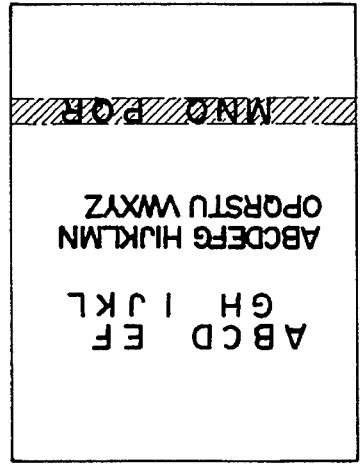
black element
number
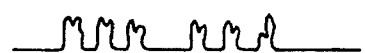
(c) L-1
black element number
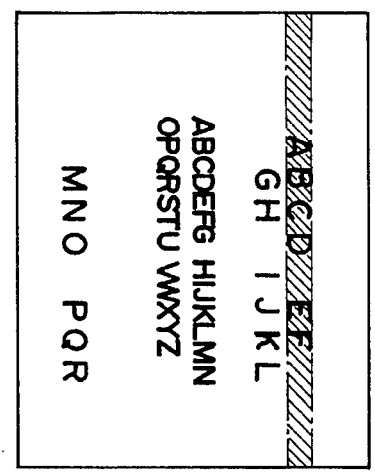
(d) L-2
black element number
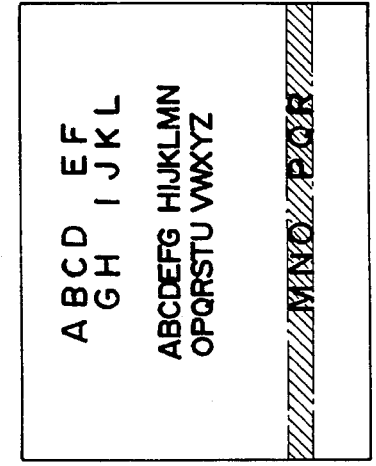

FIG. 23

| page | longitudinal length of document | lateral length of document | character orientation | angle (°) |
|---|---|---|---|---|
| 1 | 297 | 210 | portrait | 0 |
| 2 | 297 | 210 | portrait | 180 |
| 3 | 210 | 297 | landscape | 90 |
| 4 | 210 | 297 | landscape | 270 |
| ⋮ | | | | |

DIGITAL COPYING APPARATUS CAPABLE OF FORMING A BINDING AT AN APPROPRIATE POSITION

BACKGROUND OF THE INVENTION

1. Field of the Invention

The present invention relates to a digital copying apparatus. The present invention more specifically relates to a digital copying apparatus capable of specifying a binding position as a relative position relating to an original image to prepare binding at said same relative position relating to a copy image.

2. Description of the Related Art

When binding of copy sheets is desired, a binding position (direction) is specified on an operation panel, and thereafter an original document is placed at a predetermined position on a document platen whereupon a copy is made. In such cases, the binding position (direction) is the relative position (direction) relating to an original document sheet placed at a predetermined position on the document platen, and is not a relative position (direction) relating to the original document image.

Bound copy images are formed on a copy sheet in the following manner.

When specifying the binding position (direction) at the leading edge or trailing edge of the copy sheet in the copy sheet feeding direction, a non-image region for binding is formed at said leading edge portion or trailing edge portion by adjusting the original document read timing and sheet feed timing of the copy sheet. When specifying the binding position (direction) at the top edge or bottom edge of the copy sheet in a direction perpendicular to the copy sheet feeding direction, the electrostatic latent image formed on said top edge portion or bottom edge portion is exposed to light so as to erase said electrostatic latent image and form a non-image region.

Conventionally, the specification of a binding position (direction) is accomplished relative to an original document sheet placed at a predetermined position on a document platen, and is not accomplished relative to the original document image. Therefore, the placement direction and placement position, or original document image direction (top and bottom) may be mis-positioned whenever an original document is placed on the document platen, such that binding of the copy sheet at a desired position is not possible. In order to place the binding at a desired position, it is necessary to exercise sufficient care in the placement of the original document.

SUMMARY OF THE INVENTION

A main object of the present invention is to provide a copying apparatus capable of forming a binding reliably at a desired position relative to the copy image.

A further object of the present invention is to provide a copying apparatus capable of forming a binding at a desired position without regard to the original document placement position, or the top and bottom orientation of said original document or placement position.

These and other objects of the present invention are accomplished by providing a digital copying apparatus which reads an original image of an original document placed on a document platen, generates digital image data in accordance with said read image, and forms a copy image on a copy sheet based on said image data, said digital copying apparatus comprising a binding input device for inputting a binding position on a copy sheet as a relative position in relation to said original image, a first detector for detecting an orientation of the original document and an orientation of the original image based on said image data, a second detector for detecting an orientation of a copy sheet and a controller for controlling formation of the copy image based on the orientations of the original document and original document image detected by said first detector and the orientation of the copy sheet detected by said second detector so as to provide a binding at said relative position in relation to the copy image.

These and other objects, advantages and features of the present invention will become apparent from the following description thereof taken in conjunction with the accompanying drawings which illustrate specific embodiments of the invention.

BRIEF DESCRIPTION OF THE DRAWINGS

FIG. 15 is an illustration showing the data used for original document orientation (size) detection;

FIG. 16 is an original document management table created by CPU 1;

FIGS. 20*a*, 20*b*, 20*c*, and 20*d* are illustrations of the conditions of calculating the number of black image elements in the main scan direction and sub-scan direction to determine the top and bottom of the image and portrait or landscape orientation of the image via the process of CPU 6;

FIGS. 21*a*, 21*b*, 21*c*, and 21*d* are illustrations of the conditions of calculating the number of black image elements in a direction perpendicular to the first line to extract each character contained in the first line for use in a pattern check via the process of CPU 6;

FIG. 23 is an original document management table created by CPU 6;

DETAILED DESCRIPTION OF THE PREFERRED EMBODIMENTS

The preferred embodiments of the present invention are described hereinafter.

(1) Binding specification and preparation method summary

Figure 3:
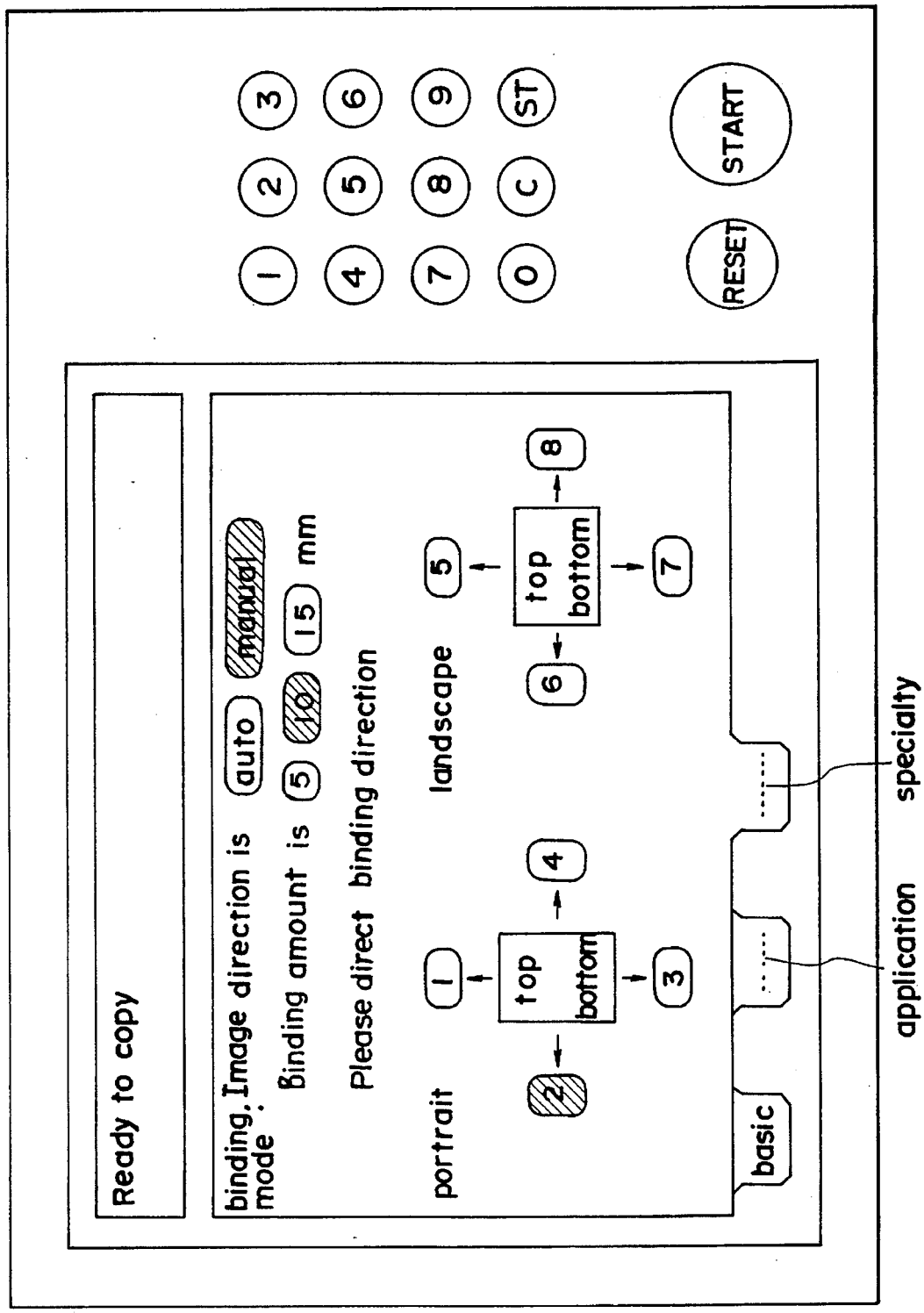
FIG. 3 is an illustration showing the condition when the manual mode is selected in the special purpose mode.
Figure 4:
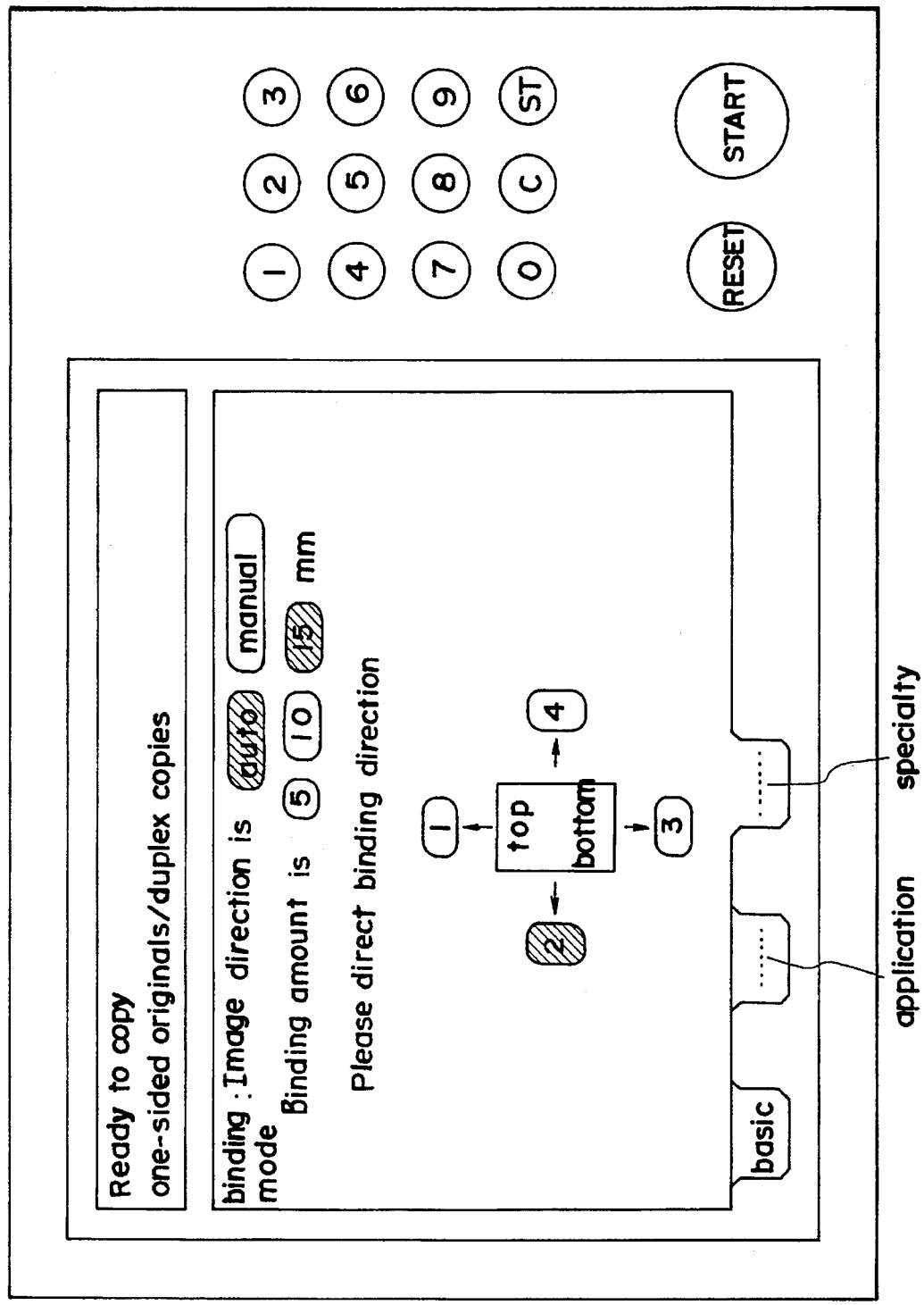
FIG. 4 is an illustration showing the condition when the auto mode is selected in the special purpose mode.

In the copying apparatus of the present embodiment, binding position specification input is accomplished as shown in FIGS. 3 and 4.

FIG. 3 shows the manual mode, wherein the binding can be specified at a position at the top or bottom and left or right sides of an original document image in portrait or landscape orientation. In this case, when the original document is disposed in portrait orientation the short edge is aligned along the sheet feeding direction of the copy sheet, whereas when the original document is disposed in landscape orientation the long edge is disposed along the sheet feeding direction of the copy sheet. In FIG. 3, a 10 mm binding is prepared at the left edge of the original document image in portrait orientation, such that touch switch 2 is specified.

FIG. 4 shows the auto mode, wherein the binding can be specified at a position at the top or bottom and left or right sides of an original document image regardless of the document orientation. In FIG. 4, a 15 mm binding is prepared at the left edge of the original document image regardless of document orientation, such that touch switch 2 is specified.

Figure 1:
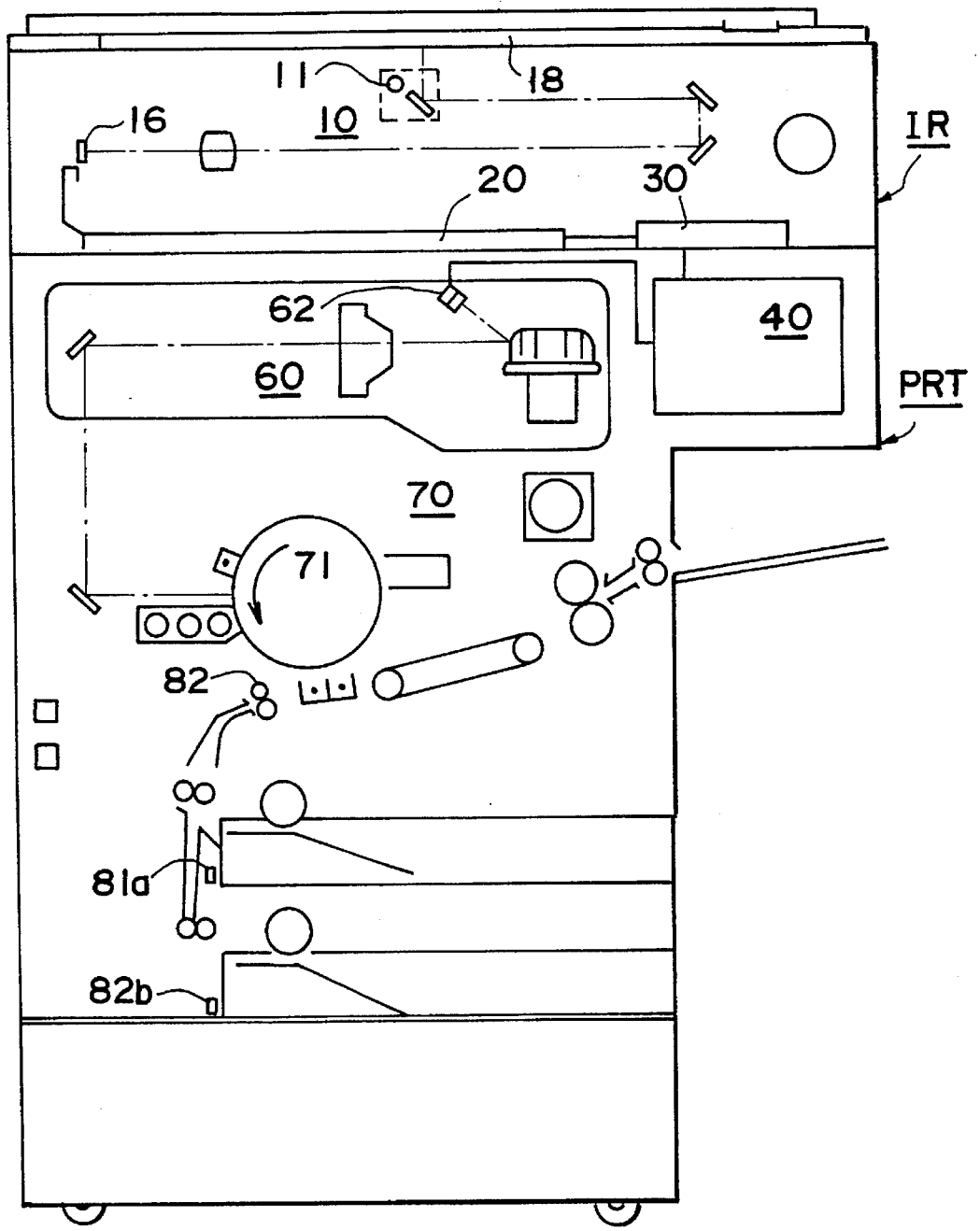
FIG. 1 is a plan view showing the construction of the copying apparatus of an embodiment of the present invention.

Binding specified for the left edge or right edge of an original image is formed at the leading edge or trailing edge of the copy sheet in the copy sheet transport direction by regulating the timing by which the original document is read and the feed timing of the copy sheet via the timing roller 82 (refer to FIG. 1).

When the binding is formed at the leading edge of the copy sheet, the copy sheet is fed from the timing roller 82 by a length corresponding to the binding width only whenever a copy sheet is on standby at the timing roller 82 position. The timing by which the copy sheet is fed via the timing roller 82 and the timing for reading the image data via the image reader IR (refer to FIG. 1) are controlled in the same manner when binding is not normally specified. Thus, a white strip for binding is formed at the leading edge portion of the copy sheet in the copy sheet feed direction.

When a binding is formed at the trailing edge of the copy sheet, the standby position of the copy sheet at the position of the timing roller 82 is controlled in the same manner as normally when no binding is specified. In relation to the timing for reading image data by the image reader IR (refer to FIG. 1), the timing by which the copy sheet is fed by the timing roller 82 is delayed only for a period corresponding to the binding width. After completion of image data transmission, the white data corresponding to the binding width is transmitted. Thus, image data can be transmitted relatively quickly, to form the white area for binding at the trailing edge of the copy sheet in the sheet transport direction.

Binding specified for the top edge or bottom edge of an original image is formed at the top edge or bottom edge of the copy image by moving the image data in the main scan direction.

Figure 6:
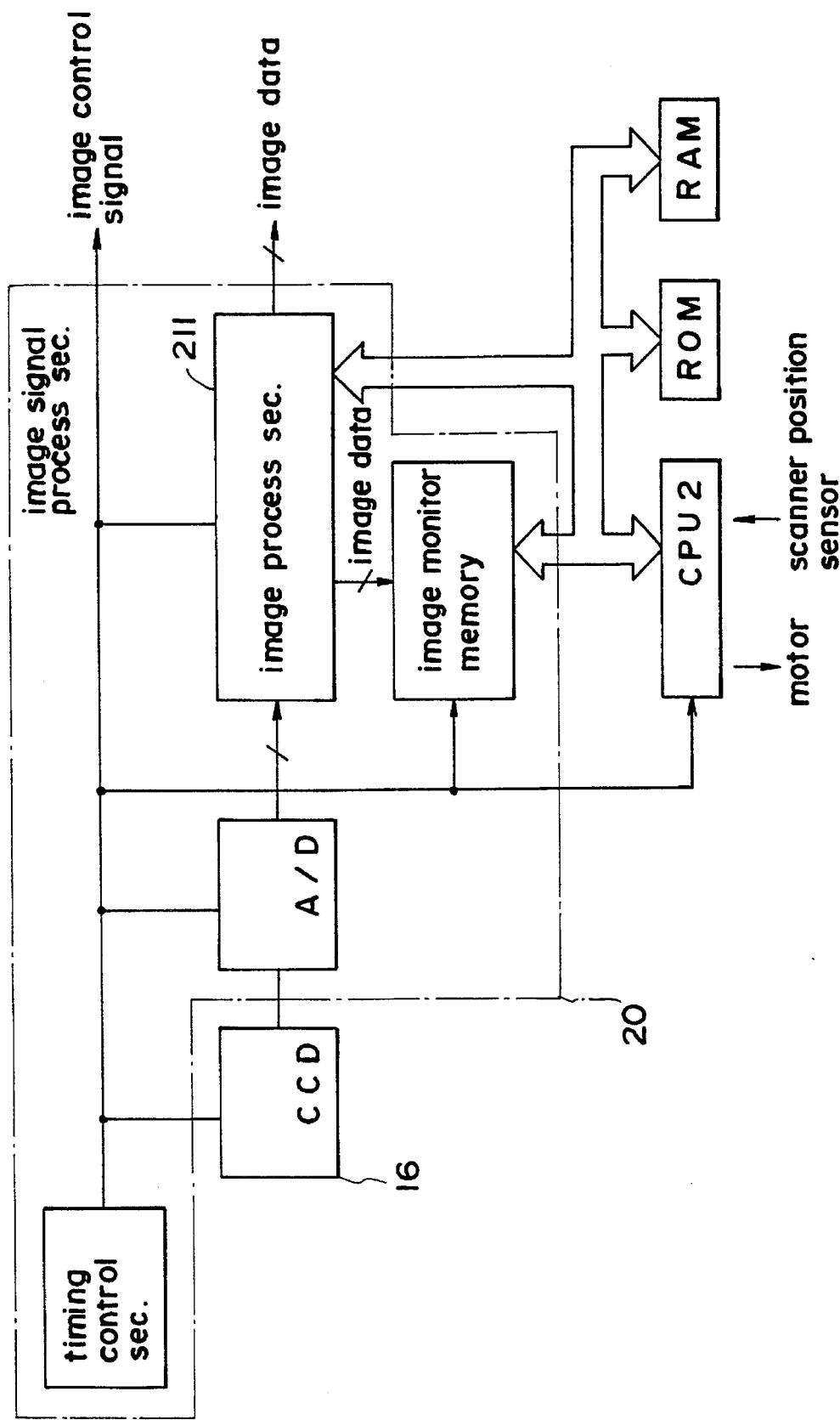
FIG. 6 is a block diagram showing the image processing signal section of FIG. 5.
Figure 7:
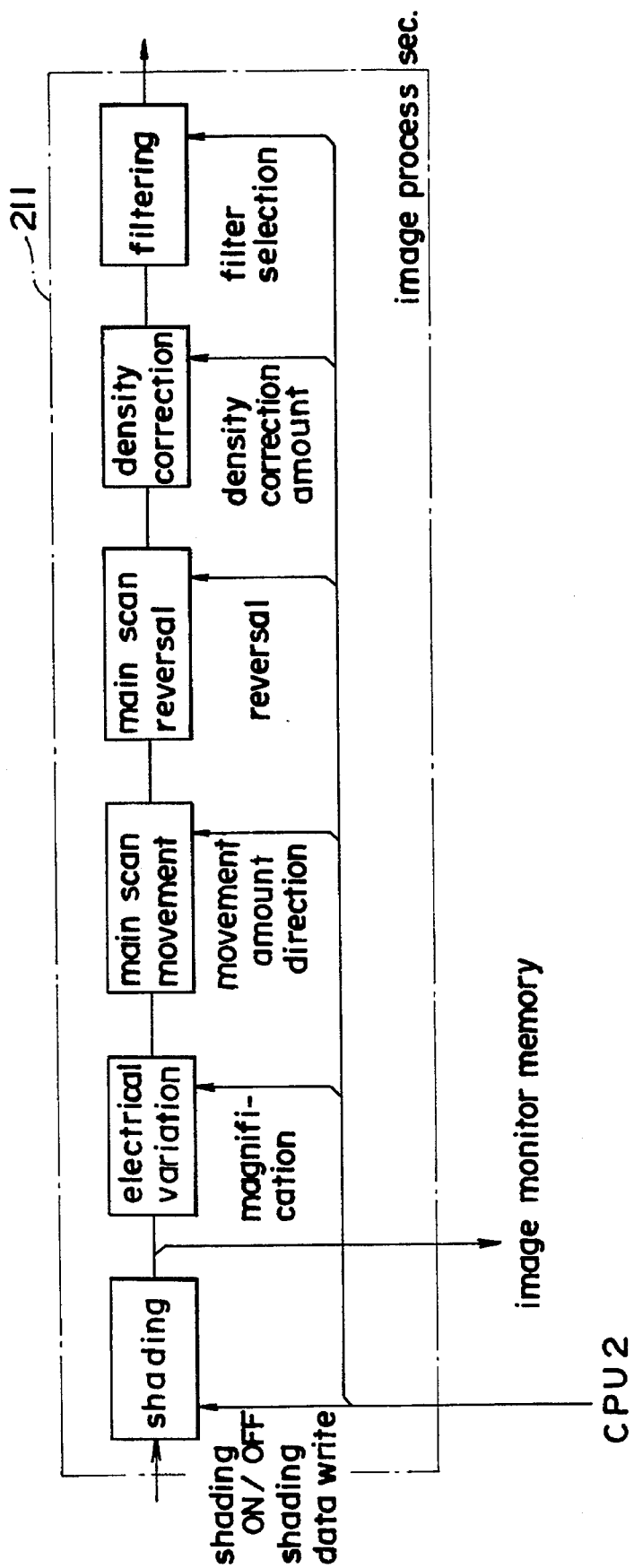
FIG. 7 is a block diagram showing functions of the image processing section of FIG. 6.
Figure 12:
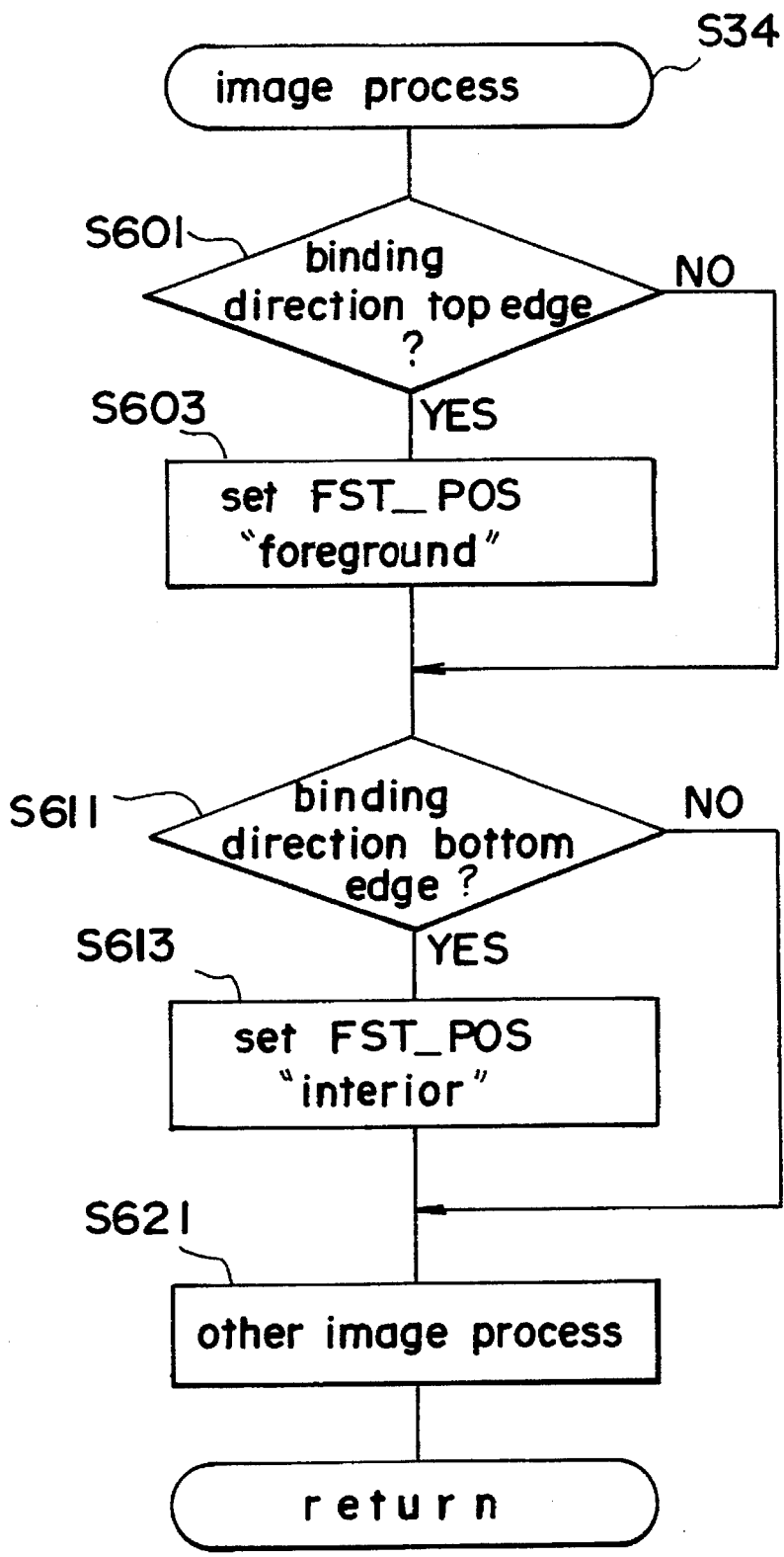
FIG. 12 is a flow chart showing step S34 of FIG. 10.

When forming a binding at the top edge of a copy sheet, data specifying a movement amount equivalent to the binding width and movement toward the front side are transmitted from the CPU 2 of FIG. 6 relative to the main scan movement block (refer to FIG. 7) of the image process section 211 (refer to FIG. 12).

The timing for reading the image data by the image reader IR (refer to FIG. 1) and the timing by which the copy sheet is transported by the timing roller 82 are controlled in the same manner as normally when no binding is specified.

The combinations of one-sided originals/duplex originals and one-sided copies/duplex copies are described hereinafter in relation to binding.

In forming a binding at the left edge of a copy image in the case of combined single-sided/duplex copies, said binding is formed on the trailing edge side of the copy sheet relative to odd number pages of the original, and on the leading edge side of the copy sheet relative to even number pages of the original. Similarly, when forming a binding on the left edge of a copy image in the case of duplex originals/duplex copies, said binding is formed on the trailing edge side of the copy sheet relative to a first surface of said original, and on the leading edge side of the copy sheet relative to a second surface of said original.

When forming a binding on the top edge of a copy image in the case of one sided/duplex copies, a binding is provided on the top edge side of the copy image relative to odd number pages of the original, and on the bottom edge side of the copy image relative to the even number pages of the original. Similarly, when forming a binding on the top edge of a copy image in the case of duplex originals/duplex copies, said binding is formed on the top edge side of the copy sheet relative to a first surface of said original, and on the bottom edge side of the copy sheet relative to a second surface of said original.

(2) Outline of copy apparatus construction

FIG. 1 is a plan view in section showing the construction of an embodiment of the copying apparatus of the present invention.

The copying apparatus in the drawing is provided with an image reader section IR and a printer section PRT.

The image reader section IR is provided with a scanning unit 10 for exposing via a lamp 11 an original document disposed face downward on a document platen 18 and scanning said document in a sub-scan direction during said exposure, Primary image sensor (CCD) 16 for photoelectrically converting the light reflected by the original document and directed thereto by the scanning unit 10 and creating electrical signals via said photoelectric conversion, image signal processing section 20 for processing the electrical signals output from said CCD 16 and creating image data D2 based on said signals, and memory unit section 30 for accommodating said image data D2 transmitted from the image signal processor 20 and for rotation processing and the like.

The printer section PRT is provided with a print process section 40 which modulates the output of the laser diode 62 in accordance with the image data D3 transmitted from the memory unit section, laser optical unit 60 for scanning in an axial direction (main scan direction) the surface of a photosensitive drum 71 via laser light emitted from said laser diode 62, and an image forming section 70. The image forming section 70 is provided with a member for developing via toner an electrostatic latent image formed on the surface of the photosensitive drum 71 via laser light, a member for transporting a copy sheet to the photosensitive drum 71 and onto which is transferred the developed toner image, and a member for fixing said toner image transferred onto the surface of said transfer sheet.

The copy sheet size and directional orientation (i.e., portrait or landscape directions) is detected by means of a sensor 81a and sensor 81b.

Although, in FIG. 1, the placement of an original document on the document platen 18 is accomplished via a manual operation by an operator, it may similarly be achieved by providing an automatic document feeder (ADF) or the like.

Furthermore, although a device is shown for forming an image on first side of a copy sheet only, a copy sheet refeeding unit (a unit used to recycle a copy sheet which has had a copy image fixed on a first side thereof) may be provided to allow formation of copy images on both sides of a copy sheet.

(3) Control circuit outline

Figure 5:
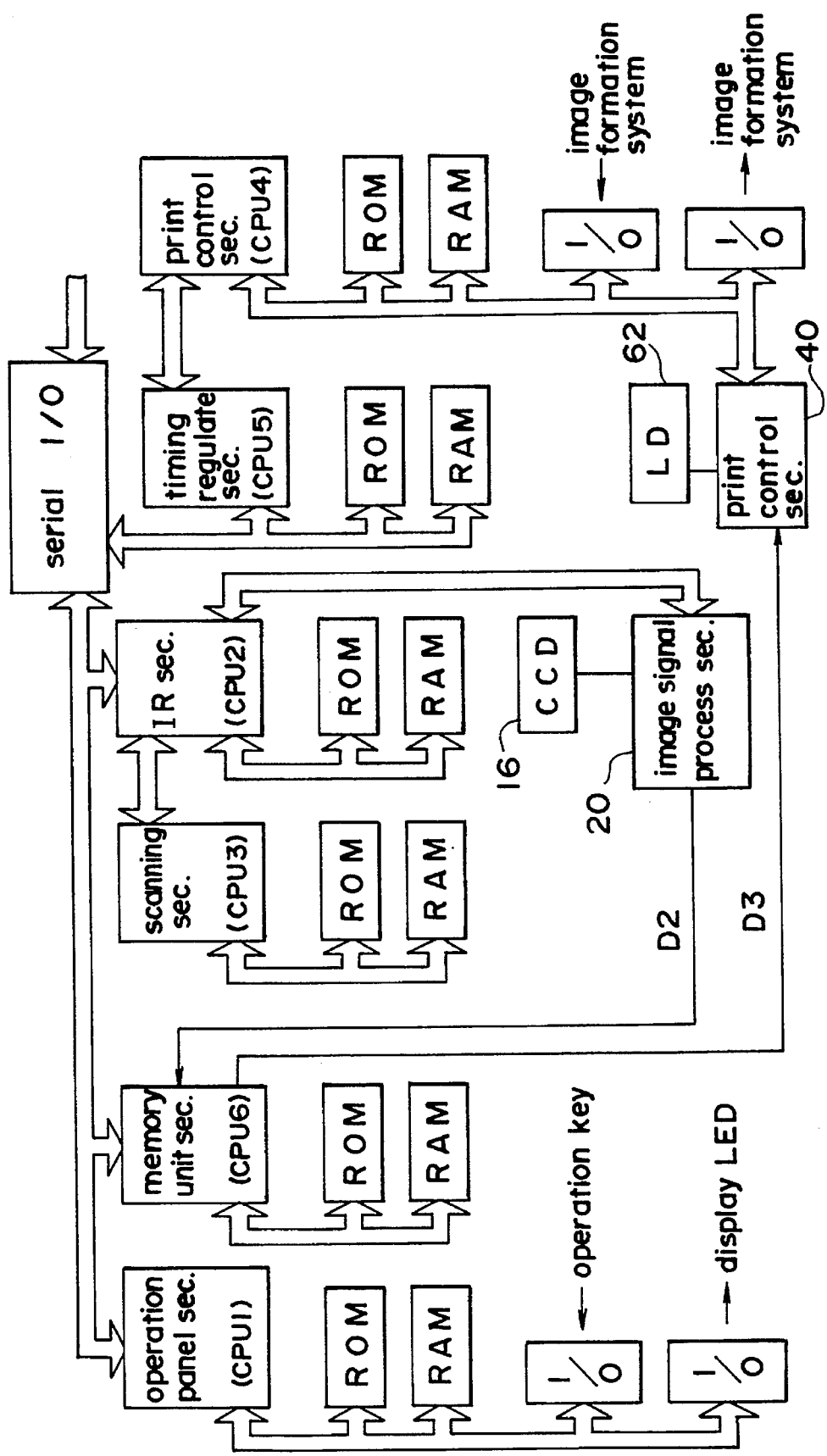
FIG. 5 is a block diagram showing the construction of the control circuit of the copying apparatus of FIG. 1.

FIG. 5 shows the general construction of the control circuit of the present apparatus.

The control circuit of the present apparatus provides six central processing units (CPU 1–6) which are mutually connected for executing processes. Each CPU has connected thereto a read only memory (ROM) for storing various control programs, and random access memory (RAM) as a working area. The control circuit of the present apparatus is further provided with an image signal processor 20 for processing image signals output from the CCD 16 and generating image data D2, and print process section 40 for controlling the laser diode 61b in accordance with the image data D3 read from the memory unit section.

Figure 2:
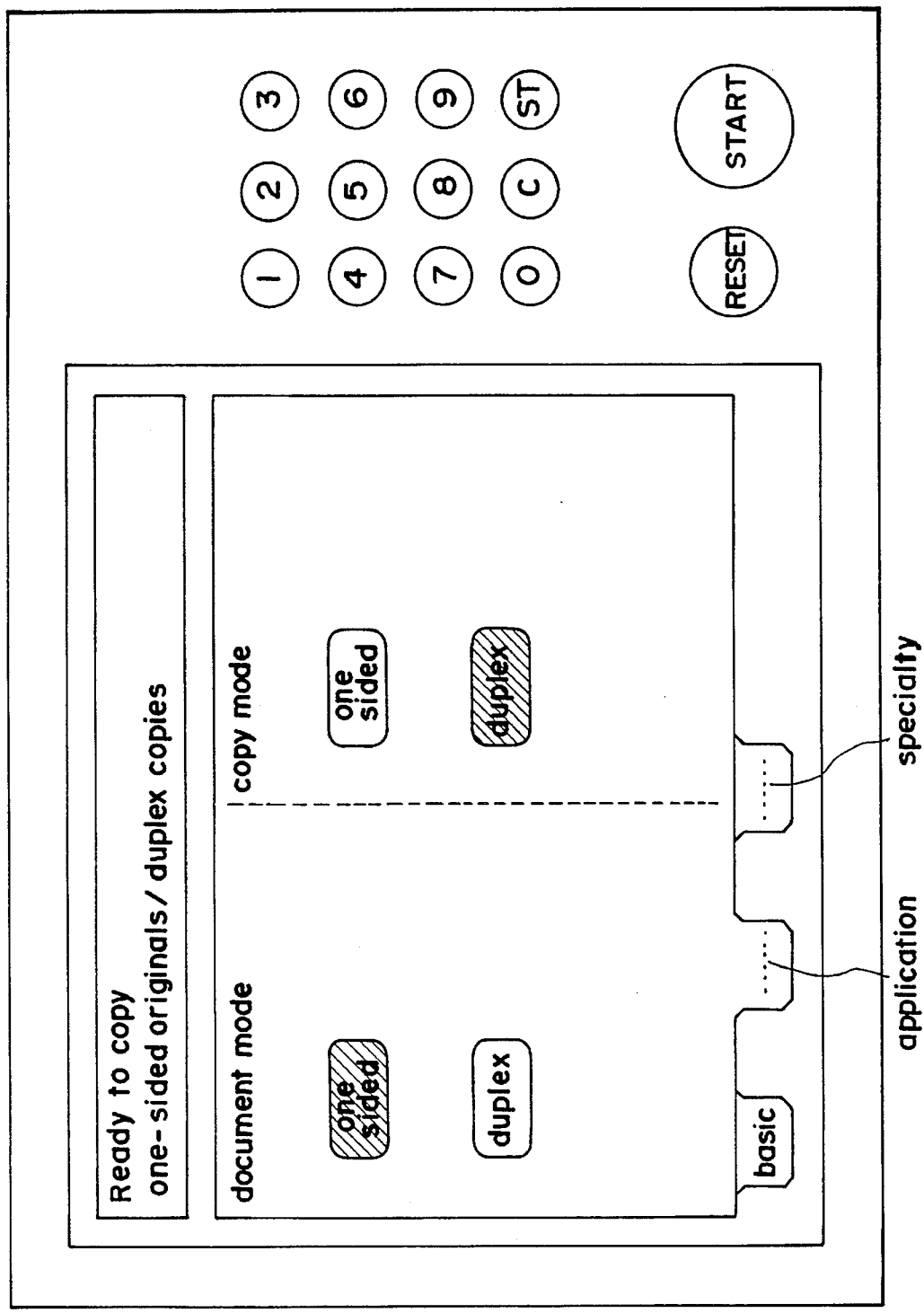
FIG. 2 is an illustration showing the operation panel in the application mode.

The CPU 1 processes input signals from the various types of keys and touch panel switches, and executes processes relating to the displays of the operation panel shown in FIGS. 2–4. The CPU 1 further specifies the binding direction. The processes executed by the CPU 1 are shown in the flow charts of FIGS. 25, 26, and FIGS. 28–30 and are described later with reference to FIG. 27.

The CPU 2 executes processes for setting parameters for the image signal processor 20, specifications for the CPU 3 of the scanning section, and detection of original document directional orientation and size. In the image signal processor 20, various image processes are executed such as movement and the like in the main scanning direction of the image. The functions of the image signal processor 20 and processes of the CPU 2 are described later with reference to FIGS. 6–12, and FIGS. 14 and 15.

The CPU 3 executes sub-scan drive control.

The CPU 4 executes sequence control of the print process section 40 and image formation unit 70.

Figure 13:
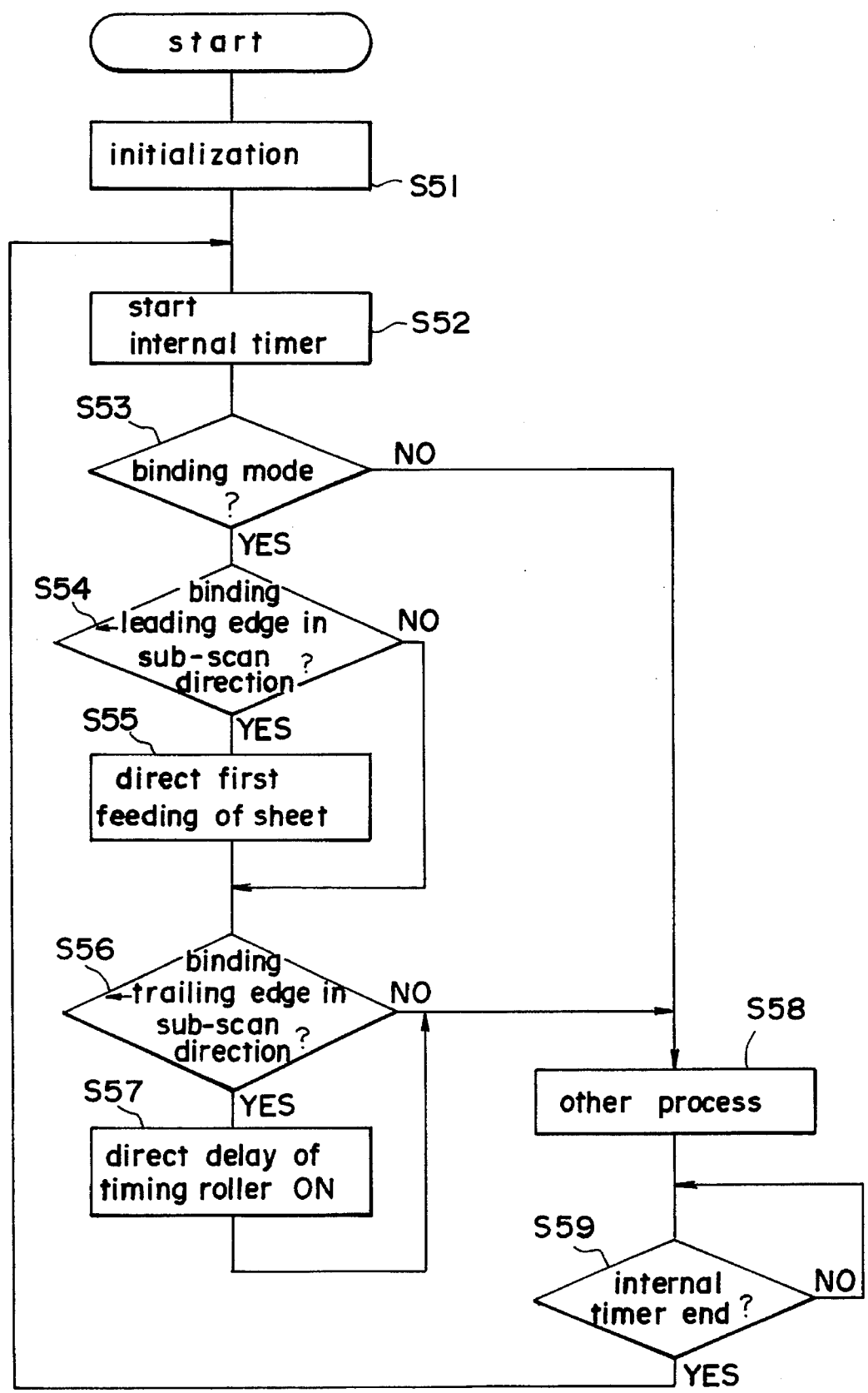
FIG. 13 is a flow chart showing the main routine of CPU 5.

The CPU 5 executes processes for regulating the overall timing of the control circuit of the present apparatus, and setting the operation modes. Binding creation is executed relative to the leading edge or trailing edge of the copy sheet as shown in FIG. 13. These processes are described in detail later.

The CPU 6 controls the memory unit section. Detection of the image directional orientation and rotation of the image are accomplished by the memory unit section. Processes of the memory unit section and the CPU 6 are described fully later with reference to FIGS. 16–23.

(4) Construction and functions of the image signal processor 20

FIG. 6 shows the construction of the image signal processor 20. FIG. 6 shows the functions of the image process section 211. In the image signal processor 20, each block of the process is executed in accordance with image reading synchronization signals received from the timing control section, and in accordance with the parameter settings set by the CPU 2.

Firstly, the CCD 16 reads the original document in single line units, and generates original document read signals which are converted into digital data by an analog-to-digital (A/D), which are thereafter transmitted to the image process section 211.

In the image process section 211, the following processes are sequentially executed: image quality corrections such as shading correction, MTF correction, γ correction, and electrical variation, main scan movement, main scan reversal, density correction, filtering and the like. After the aforesaid processing, the image data D2 are transmitted to the memory unit section.

Shading correction corrects for non-uniform light quantity and irregularities in reading element sensitivity in the main scan direction. It is possible to switch between the mode for executing shading correction and the mode for not executing shading correction by a shading ON/OFF signal set via the CPU 2. During output regulation by the CCD 16, the non-shading correction mode is set to allow throughput of the CCD 16 output. Reading data when a standard white pattern is read are written to a shading RAM in accordance with shading timing signals.

The variable magnification (density conversion) of the image data in the main scan direction is executed in the electric conversion block. This magnification rate is set by the CPU 2.

The image data are shifted in the main scan direction in the main scan movement block. That is, a shift corresponding to the binding width formed on the top edge or bottom edge of the copy image, i.e., the movement of the movement mode, is executed. The amount and direction of the aforesaid shift is set by the CPU 2. The process is described in detail later.

The image data are reversed in the main scan direction in the main scan reversal block. When a mirror image of the original image read by a normal scan is desired, or when a normal image or the original image read by a reverse scan is desired, the reversal request signal is transmitted from CPU 2 and reversal is accomplished in accordance therewith.

Background removal and density reproducibility correction are accomplished in the density correction block. The amount of background removal and amount of reproducibility correction (density gradient) are set by CPU 2.

The edge highlight process, smoothing process, and combinations thereof are accomplished in the filtering block. Filter process selection and mix ratio are set by CPU 2.

After the previously mentioned shading correction, data are transmitted to the image monitor memory specified by CPU 2, and said image data are stored in one-line segments. The directional orientation and size of the original document are detected based on said one-line segment image data stored in memory in a manner described later.

(5) Image data shift (movement in main scan direction)

Image data are shifted as follows in the main scan direction in the main scan movement block of the previously mentioned image process section 211. This shift of image data occurs when, for example, a binding is formed on the top edge or bottom edge of a copy image.

Figure 8:
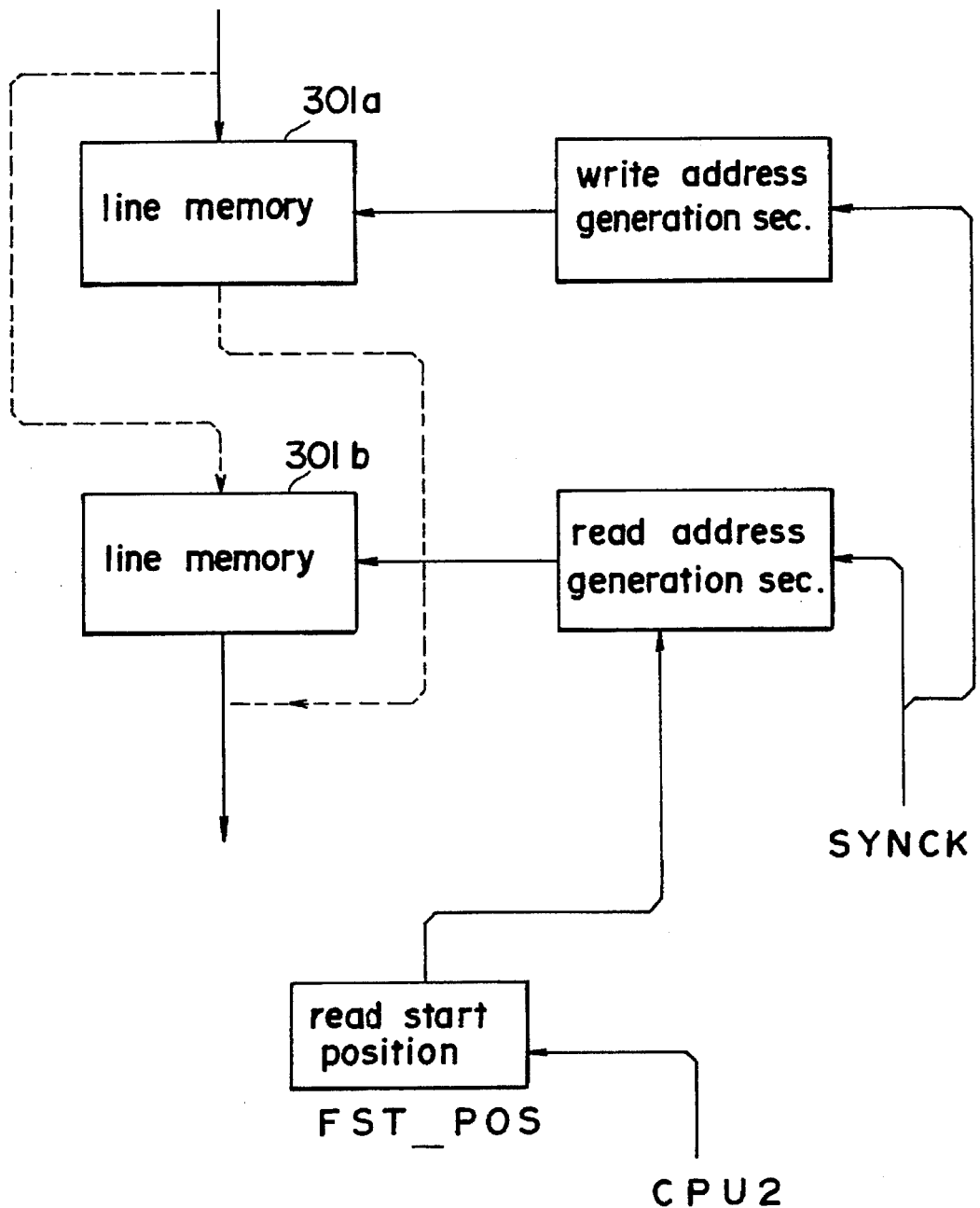
FIG. 8 is a block diagram showing the main scan movement of FIG. 7.

Firstly, the image data from the electric variation block are stored in the line memory 301a, as shown in FIG. 8. Address control at this time is accomplished by the write address generation section. The write address generation section generates address data by counting clock signals. Clock signals are the transfer clock SNYNCK of input image signals.

Each time the horizontal synchronization signal HSYNC is input, the relationship is switched between the line memory 301a and line memory 301b, and the write address generation section and read address generation section. That is, when the image data of a certain line have been stored in the line memory and thereafter the next data of the next line are input, the line memory in which is stored the image data of said certain line are read out by the specification of the read address generation section. This read address generation section also generates address data by means of counting the transfer clock SYNCK signal.

Figures 18, 19:
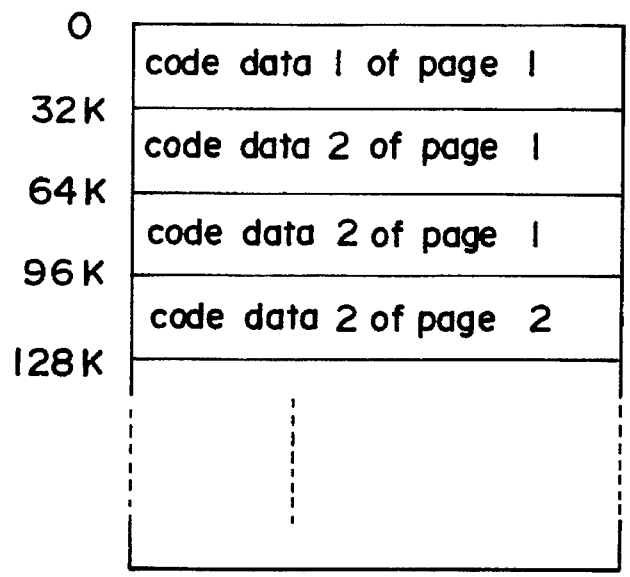
FIG. 18 is a memory map of the code memory of the memory unit section.
FIG. 19 is a management table for the code memory created by CPU 6.

In relation to the read address generation section, a read start position signal FST_POS signal is transmitted from the CPU 2 during the binding shift (image shift). That is, when a binding position is specified at the top edge section of a copy image (step S601: YES), the "foreground" predetermined position is set as FST_POS (step S603), as shown in FIG. 19. When the bottom edge is specified (step S611: YES), the "interior" predetermined position is set (step S613). The binding position is set in accordance with the input from the operation panel; this is described in more detail later with reference to FIG. 30.

The read start position signal FST_POS is transmitted from the CPU 2 to the read address generation section to accomplish the image data shift.

Figure 9A:
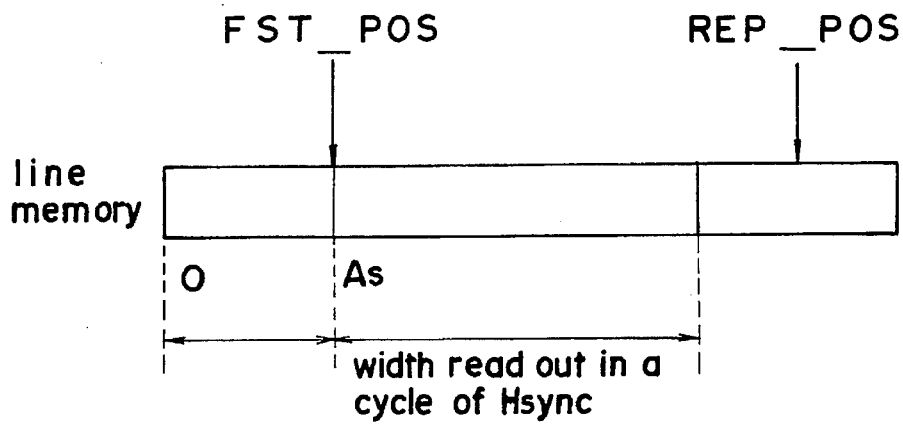
FIGS. 9*a* and 9*b* are illustrations of the main scan movement.
Figure 9B:
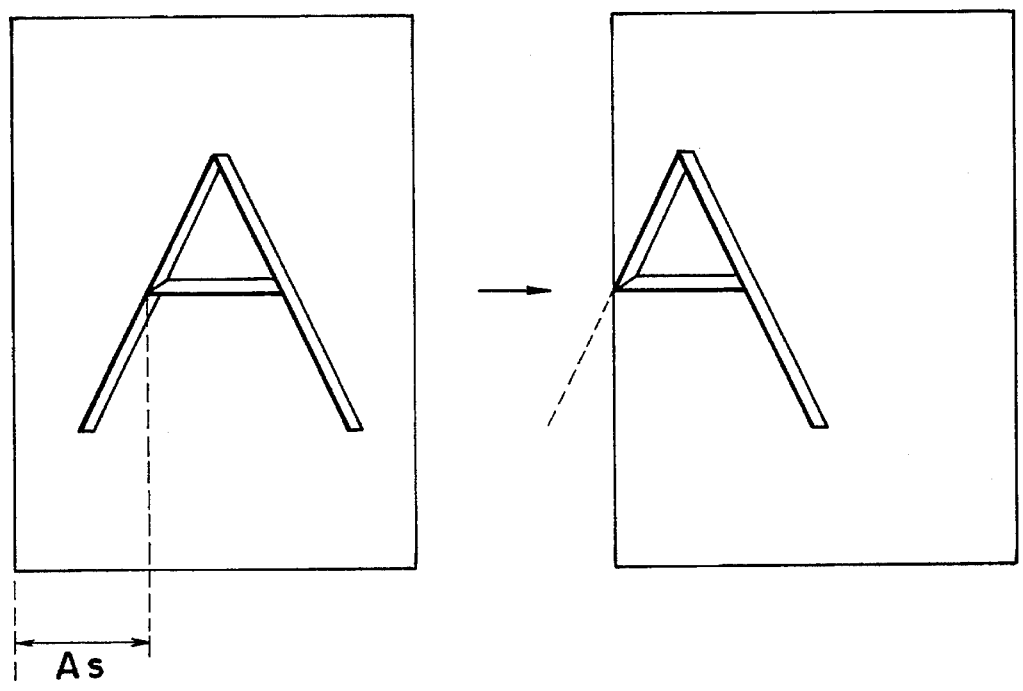

For example, the read start position from the line memory 301a (301b) is normally address [0] of the line memory. When the aforesaid read start position signal is transmitted, the readout starts from the set position As ($\neq 0$; refer to FIG. 9a), thereby shifting the image "A" (refer to FIG. 9b). Although FIGS. 9a and 9b show the image shift leftward (As>0), a rightward image shift can be realized when the setting is As<0.

(6) Original document directional orientation and size detection

The image signal process section 20 is controlled by the previously mentioned CPU 2. Original document directional orientation and size detection is accomplished by the CPU 2 in the manner described below.

Firstly, when a command for detect original document directional orientation is issued from CPU 1 and said detection is executed by CPU 2 (Step S501: YES, FIG. 11), a command to execute a pre-scan is transmitted from CPU 2 to CPU 3 (Step S503), and the directional orientation of the original document is detected based on the signals derived from said pre-scan (step S505).

Figure 14:
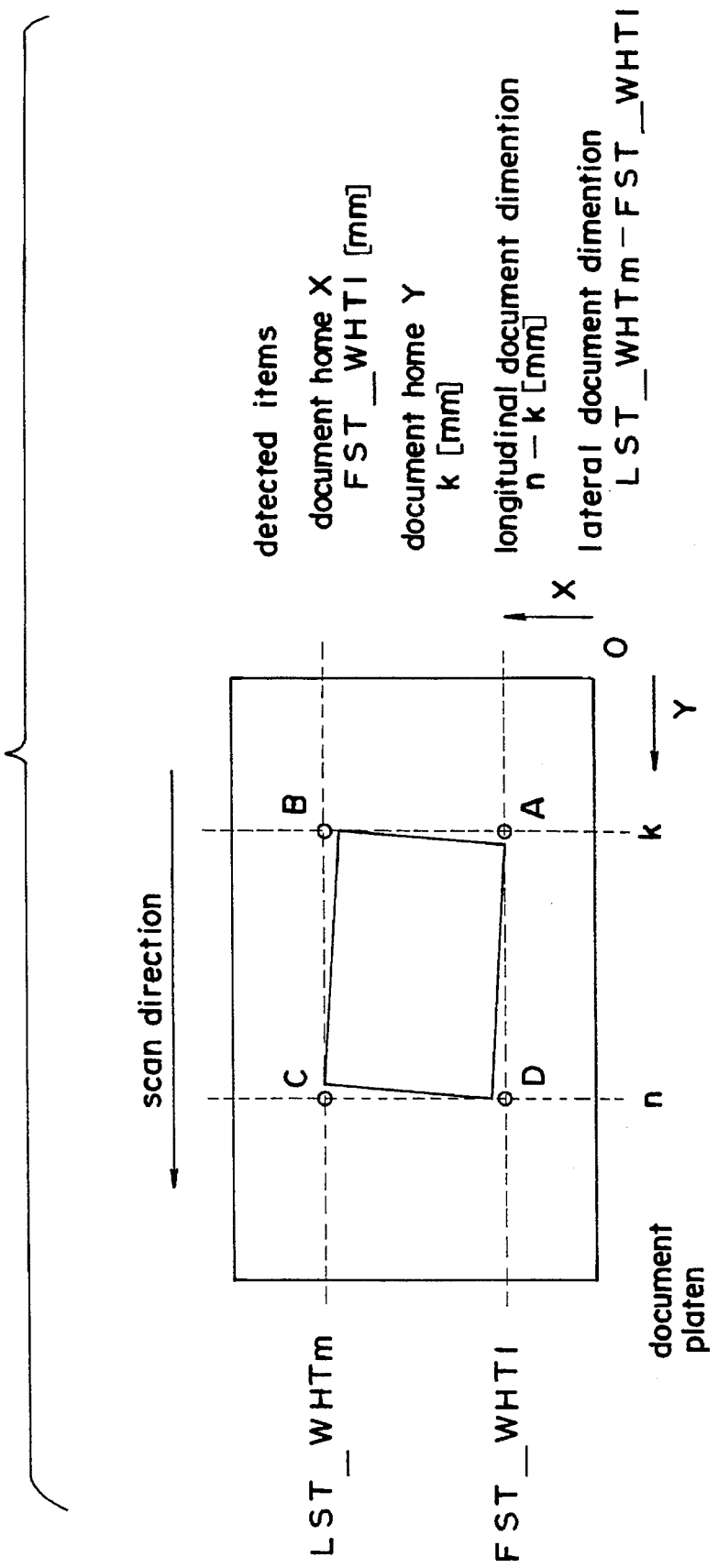
FIG. 14 is an illustration showing the original document orientation (size) detection method.

The image data read by the aforesaid scan and corrected for shading were periodically stored in line units in the memory used for image monitoring, and thereafter said image data are read out, and the read image data are scanned from the standard position side in the main scan direction. That is, a scan is executed in the direction X shown in FIG. 14. FIG. 14 shows the principle for detecting original document directional orientation and size. The document platen standard position 0 is stored beforehand by the CPU 2.

In the scan in the X direction, the address (FST_WHT) of the first "white" level detected in the X direction and the address (LST_WHT) of the last "white" level detected in the X direction are stored in buffers corresponding to the sub-scan position (=line position, i.e., the position in the Y direction from the document platen standard position 0). A value [0] is stored at the lines where a white level is not detected (refer to FIG. 15).

When the buffer data are stored, the size and position of the original document are calculated based on said buffer data.

That is, the data stored in the buffer are sequentially read, and the sub-scan position (address in the Y direction) k at which the first data other than [0] is stored is determined to be the leading edge position of the original document in the sub-scan direction (Y direction). The sub-scan position (address in the Y direction) n at which the last data other than [0] is stored is determined to be the trailing edge position of the original document in the sub-scan direction. Thus, the dimensions of the original document in the sub-scan direction are determined as [n-k].

The minimum value of FST_WHT, i.e., the address of the first "white" level detected in the X direction for each line, is calculated, and said minimum value FST_WHT1 is determined to be the leading edge position of the original document in the main scan direction (X direction). The maximum value of LST_WHT, i.e., the address of the last "white" level detected in the X direction for each line, is calculated, and said maximum value LST_WHTm is determined to be the trailing edge position of the original document in the main scan direction (X direction). Thus, the dimensions of the original document in the main scan direction are determined as [LST_WHTm_FST_WHT1].

When the leading edge position/trailing edge position/dimensions of the original document in the sub-scan direction and the leading edge position/trailing edge position/dimensions of the original document in the main scan direction are determined, the portrait or landscape orientation of the original document is identifiable based on said determinations. Furthermore, a standard size close to the aforesaid dimensions is searched, and said standard paper size is transmitted to CPU 1 as the original document size.

In CPU 1, a document management table shown in FIG. 16 is generated based on the aforesaid derived document size data. That is, for each original document a table is generated which shows the size and portrait/landscape orientation distinction of the original document.

In the previously described process, the method for identifying the document region and non-document region from the read image may be (a) a method wherein the document cover is provided with a mirror surface, and the original document area is determined to be within a range of "white" detected by the image scan, or (b) a method wherein a scan is performed with the document cover open, and the original document area is similarly determined to be within a range of "white" detected by the image scan.

Figure 10:
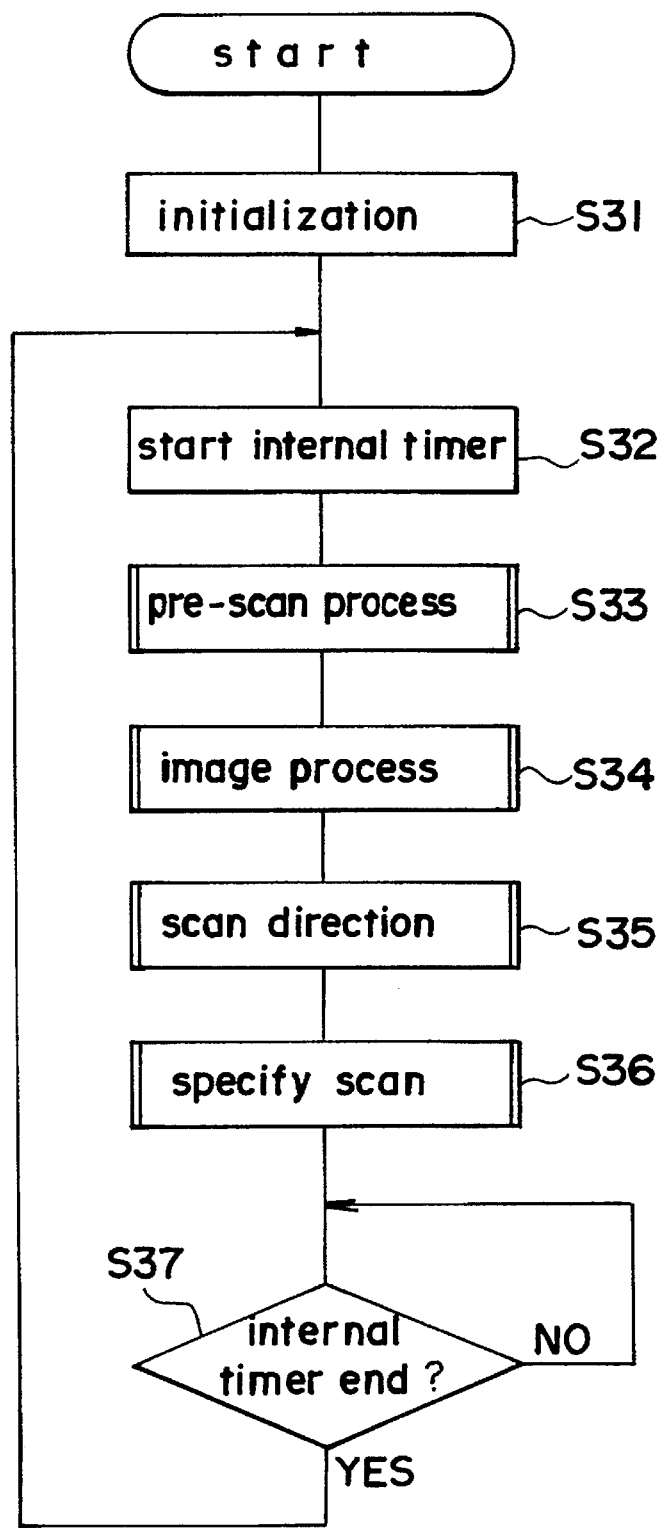
FIG. 10 is a flow chart showing the main routine of CPU 2.
Figure 11:
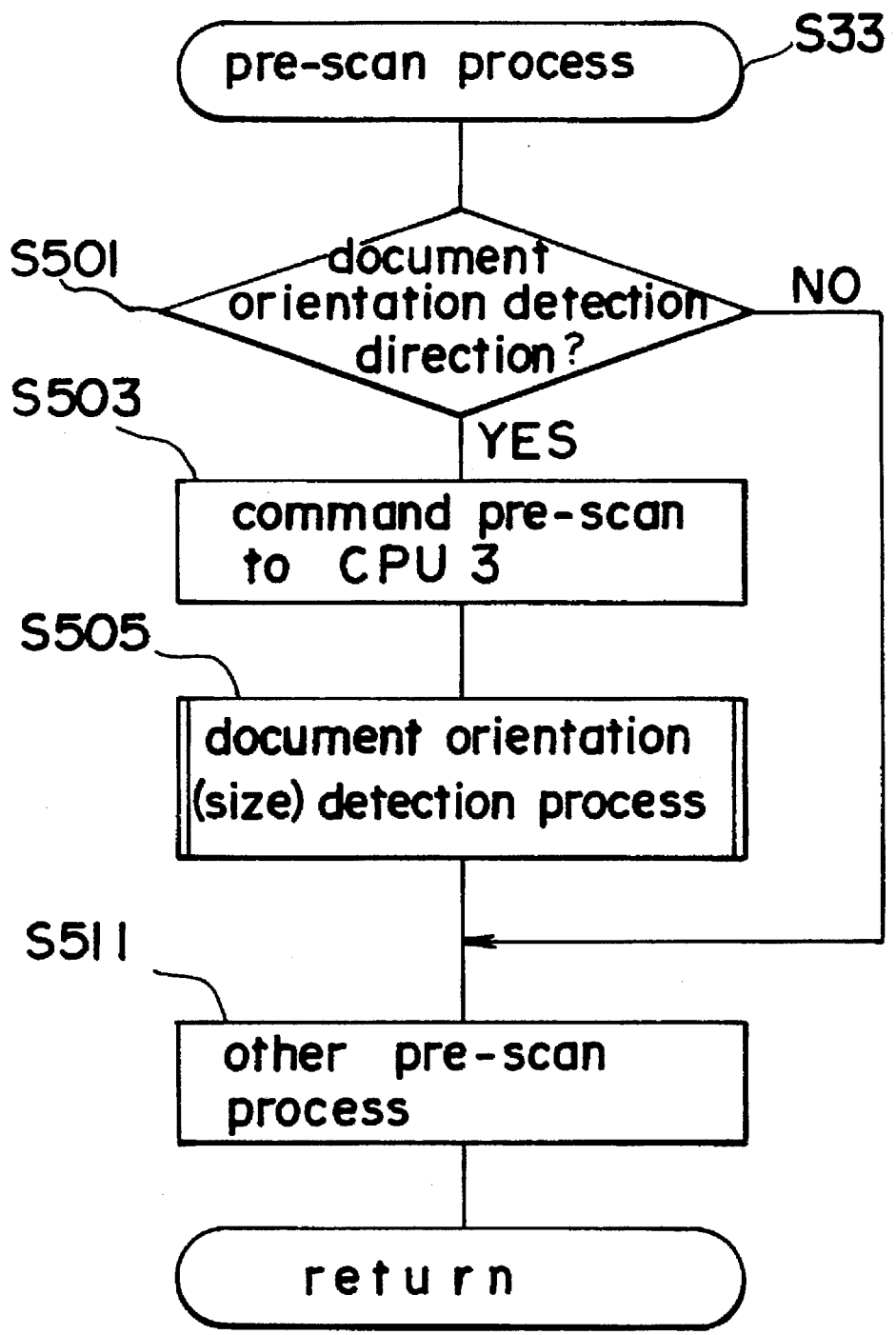
FIG. 11 is a flow chart showing step S33 of FIG. 10.

The CPU 2 also executes other processes in addition to those described above, such as a process for specifying a scan direction for a reverse read out (step S35), and a process for specifying scanning via a main scan reversal (step S36), as shown in FIG. 10.

(7) Memory unit section

Figure 17:
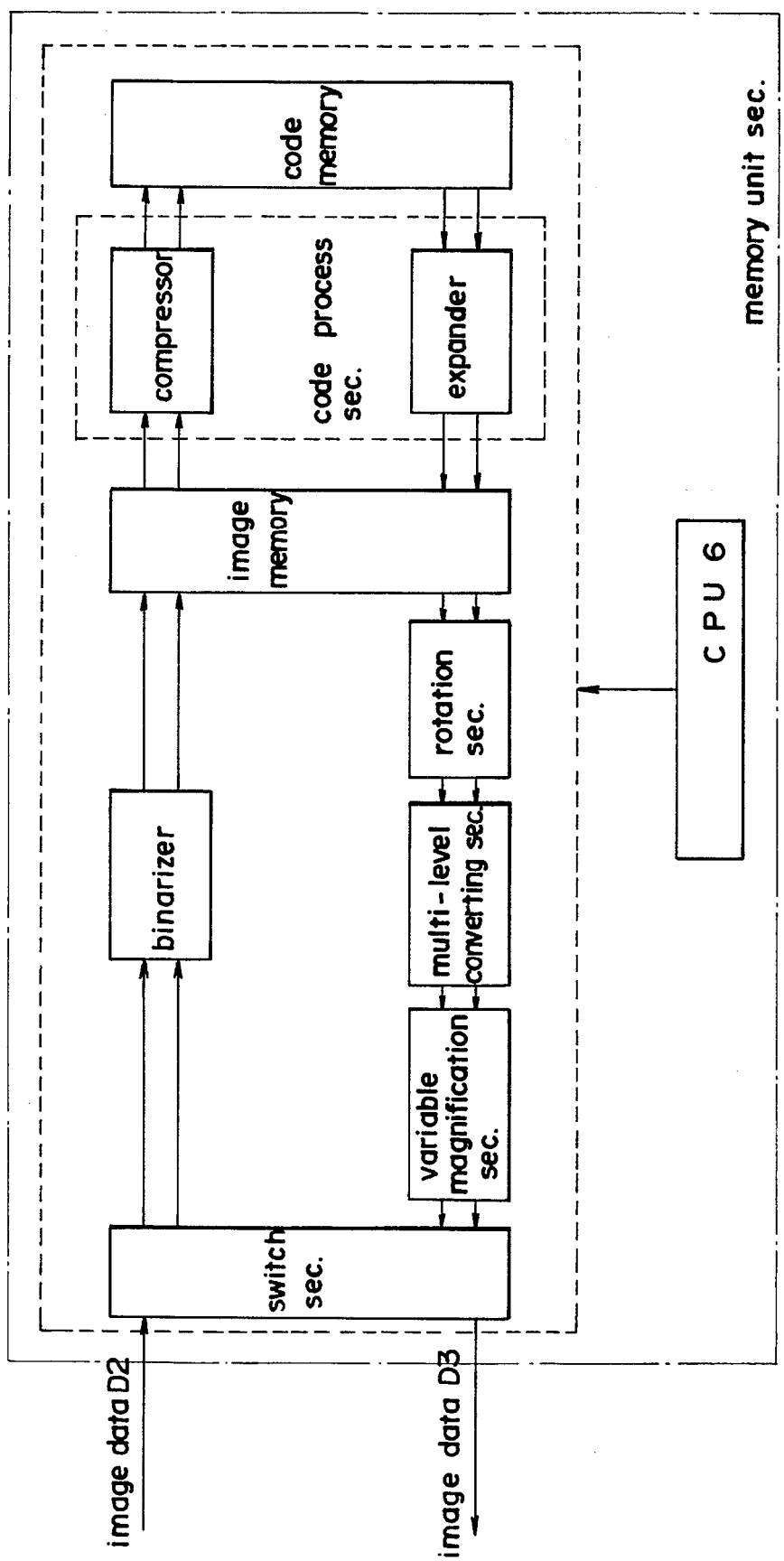
FIG. 17 is a block diagram of the memory unit section.

As shown in FIG. 17, the memory unit section comprises a switch section, binarizer, image memory, compressor, code memory, expander, rotation section, multi-level converter, and variable magnification section. These sections are controlled parameters set by the CPU 6.

The binarizer converts the image data D2 transmitted from the image signal processor 20 into binary data. The image memory is provided with multiple ports and has an A4-size two-page capacity at 400 dots per inch (dpi). The compressor and expander of the encode section are capable of mutually independent parallel operation. The code memory is provided with multiple ports. The image rotation process is executed in the rotation section. Binary data are converted to multi-level data in the multi-level converter. The image is subjected to electrical variable magnification in the variable magnification section.

When the binarizer writes the image data to the image memory, the compressor reads and compresses said image data to generate encoded data which are written to the code memory. The expander reads the data written in the code memory in accordance with instructions from CPU 6, and expands said data as image data which are written to the image memory. The data are transmitted via direct memory access (DMA).

When the expander writes one page of image data to the image memory, CPU 6 reads the image data from the image memory, and discriminates the top and bottom of the image as well as its landscape or portrait orientation. Landscape/portrait orientation is determined based on the distribution of black image elements in the main scan direction and sub-scan direction. The detection of image directional orientation is described later. Thereafter, the image data are supplied to the rotation section.

The aforesaid image data are rotated by the rotation section as necessary, and converted to multi-level data by the multi-level converter, magnification is varied as necessary by the variable magnification section, and said image data D3 are transmitted to the print process section 40 (refer to FIG. 5).

FIG. 18 shows the code memory, and FIG. 19 shows the management table for managing said code memory. The code memory is divided into memory areas in units of 32 kilobytes (kB). Code data of the same page contents are stored in the aforesaid memory areas to allow simultaneous control during writing time (image reading time) and reading time (image printing time). Stored in the aforesaid management table are number expressing the memory area of the code memory, page numbers, number of linked memory areas, and various additional information required for the compression method, and the data compression and expansion processes. The code memory is dynamically managed based on the aforesaid information.

In the management table of FIG. 19, a preconcatenation is linked in the forward direction to the memory area to each 32 kB within the same page. That is, if the value is [00], it expresses the first memory area of the page, whereas any other value expresses a number of the memory area linked in a forward direction. A post-concatenation is the same. If the value is [FF], it expresses the last memory area of the page, whereas any other value expresses the number of the memory area linked in a backward direction.

The management table of FIG. 19 is created by the CPU 6 whenever image data are read from the image memory, compressed by the compressor, and stored in the code memory. The information of the management table is erased when the number of the necessary sections are all normally discharged.

In the memory mode, the image data D2 are binarized and thereafter fetched from the image memory and subjected to predetermined processing, and are read from the image memory and output as image data D3 to the print process section 40 as required. When reading image data from the image memory, the rotation and variable magnification processes are executed in accordance with instructions from the CPU 6.

(8) Discrimination of image top and bottom and landscape/portrait orientations

Figure 22:
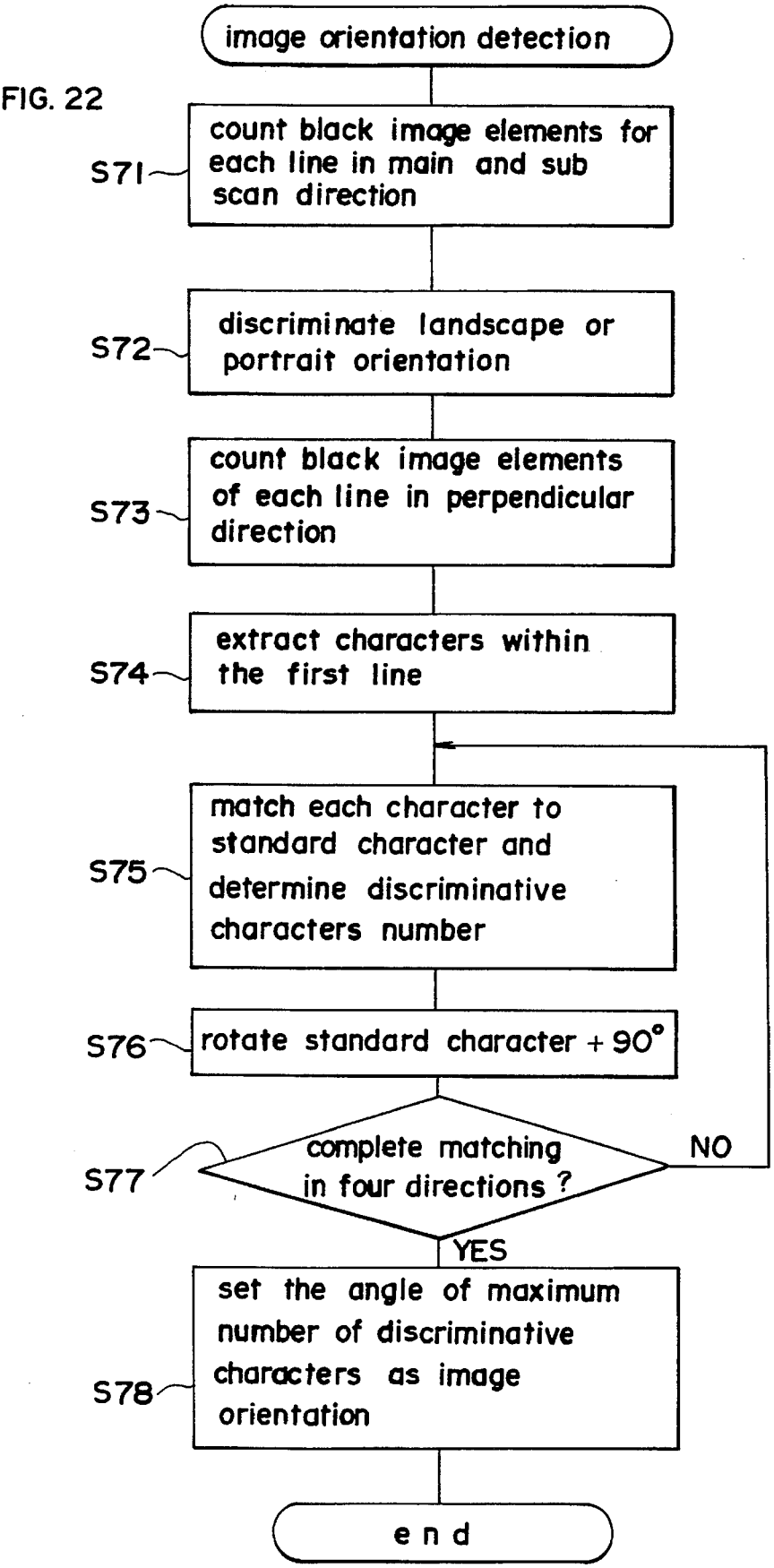
FIG. 22 is a flow chart showing the image orientation detection process performed by CPU 6.

As previously described, when the expander writes one page of image data to the image memory, the CPU 6 reads said image data and discriminates the top and bottom as well as the landscape/portrait orientation of said image, as shown in FIGS. 20–22.

As shown in FIG. 20a, the number of black image elements are counted for each line in both the main scan and sub-scan directions (step S71). The counting results in the main scan direction are shown for each image on the left side, and counting results in the sub-scan direction are shown for each image on the right side in FIGS. 20a–20d. Based on the distribution of the counted black image elements, the landscape or portrait orientation of the image is discriminated (step S72). That is, when a band-like peak appears in the distribution of black image elements in the main scan direction, a portrait image orientation is discriminated (as in the cases of FIGS. 20a and 20b), whereas when a band-like peak appears in the distribution of black image elements in the sub-scan direction, a landscape image orientation is discriminated (as in the cases of FIGS. 20c and 20d).

Then, the image data corresponding to the first line is extracted. The first line is the region of the initial appearance of the band-like peak, as indicated by the shaded area of oblique lines in FIGS. 21a–21d. After the aforesaid extraction, the number of black image elements of each line in a direction perpendicular to the aforesaid first line are counted within the region of said first line. For example, with regard to the band-like region which includes [ABCDEF], as shown in FIG. 21a, the number of black image elements of each line is counted in the sub-scan direction, i.e., a direction perpendicular to the band-like region. With regard to the band-like region which includes [MNOPQR], as shown in FIG. 21d, the number of black image elements of each line is counted in the main scan direction, i.e., a direction perpendicular to the band-like region (step S73). The counting results are shown on the bottom side of the image for portrait orientations, and on the left side for landscape orientations. The characters within the first line are extracted based on each peak (the peaks corresponding to each character within the first line) appearing in the counting results (step S74).

Next, the pattern of each extracted character is matched to standard character patterns. The angle of the standard character patterns is initially 0°, i.e., an normal upright state. After pattern matching, the number of discriminatable characters (i.e., the number of characters whose pattern matches a standard character pattern) is determined, and stored in association with the standard character pattern angle (initially 0°) (step S75).

Subsequently, the angle of the standard character pattern is rotated +90°. Since the initial standard character angle was 0°, and angle of 90° is set. Thereafter, the process of step S75 is executed, and similar pattern matching is executed using the standard character pattern set at 90°. After the aforesaid pattern matching, the number of discriminatable characters is determined, and stored in association with the standard character pattern angle (initially 90°) (step S75).

Thereafter, the standard character pattern angle is set at 180° and 270°, and the same process is executed (steps S75, S76).

When the pattern matching is completed for each standard character pattern at angles of 0°, 90°, 180°, and 270° (step S77: YES), the standard character pattern angle at which the maximum number of discriminatable characters was found is determined, and that angle is set as the image orientation direction (step S78).

Thus, the top and bottom as well as landscape and portrait orientations of the image can be discriminated. The original document management table of FIG. 23 is generated based on the aforesaid results.

(9) Readout from the image memory

When the CPU 5 determines the output mode is set based on instructions for the operation panel transmitted from CPU 1 and the selected paper size transmitted from CPU 4, the image data are read out from the image memory in accordance with said output mode and the image rotation process and the like are executed in accordance with the aforesaid discrimination results, and thereafter said data are transmitted to the print process section 40 as image data D3. In the following examples, the top and bottom of the image are consolidated for output regardless of the direction or landscape (horizontal document) or portrait (vertical document) orientation of the characters of the original document. Instructions from the operation panel via CPU 1 are described later.

The explanation follows about the data readout in accordance with the document management table of FIG. 23, for example, when A4 size vertical direction copy sheet is set at the selection aperture.

Figure 24:
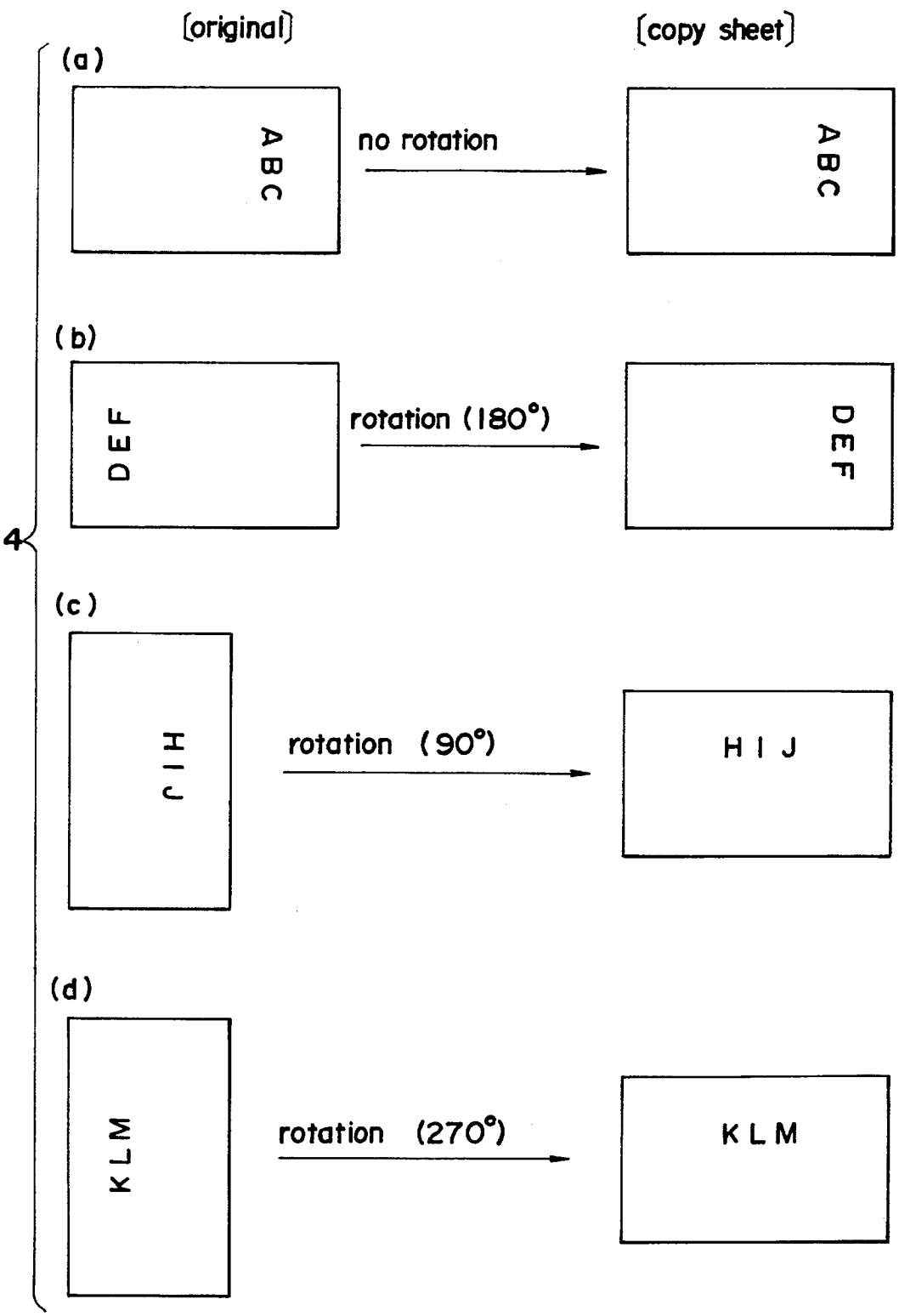
FIG. 24 is an illustration showing the relationship between the rotations of the original document image and the copy image.

Since the first page document direction and document size agrees with the copy sheet direction and copy sheet size, the image data read out from the image memory are transmitted directly to the print process section 40 without executing the rotation process. This instance is illustrated in FIG. 24a.

Since the second page of the original document direction and size agree with the copy sheet direction and size, but the image direction is the reverse of the first page, a 180° rotation process is performed by the rotation section on the image data read from the image memory. Thereafter, said data are transmitted to the print process section 40. This instance is illustrated in FIG. 24b.

Since the third page of the original document has a different directional orientation than the copy sheet, a 90° rotation process is performed by the rotation section on the image data read from the image memory. Thereafter, said data are transmitted to the print process section 40. This instance is illustrated in FIG. 24c.

The fourth page of the original document has a different directional orientation than the copy sheet, i.e., the image direction is the reverse of that of the third page. Therefore, a 270° rotation process is performed by the rotation section on the image data read from the image memory, and thereafter, said data are transmitted to the print process section 40. This instance is illustrated in FIG. 24d.

(10) Instructions from the operation panel

FIGS. 2–4 show the operation panel. The relative binding position (direction) relative to the original document image is specified in the previously described manner on the operation panel.

As shown in the drawings, provided on the operation panel are a ten key pad for numerical input, clear key for clearing numerical input, stop key for terminating a copy operation, panel reset key for resetting the mode to the initial state, and start key for starting a copy operation. Also provided on the operation panel are an LCD for setting other modes, a touch panel covering the top of said operation panel. Copy sheet size and direction selection keys are also provided on the operation panel, although not shown in the drawings.

The functions of the present apparatus are divided briefly into standard mode, application mode, and special purpose mode. Various mode setting are executed within each of the aforesaid modes to accomplish a hierarchical screen structure. That is, the functions set by the touch panel change for each screen. For example, the standard mode includes copy paper selection, magnification selection, and exposure level modulation modes. The application mode includes document mode (one-side/duplex), copy mode (one-side/duplex), discharge mode (sort/non-sort/grouping) and the like. The special purpose mode induces binding mode, mirror image mode and the like.

As previously mentioned, FIG. 2 shows the condition of the screen for setting the document mode and copy mode in the application mode when the one-side original/duplex copy mode is selected. FIG. 3 shows the condition of the screen for setting the binding mode in the special purpose mode when the mode is selected for forming a 10 mm binding on the left edge of vertical document in the manual mode. FIG. 4 shows the condition of the screen for setting the binding mode in the special purpose mode when the mode is selected for forming a 15 mm binding on the left edge of a document in the auto mode. In the case of FIG. 3, a 10 mm binding is formed on the long side of the left edge, and in the case of FIG. 4, a 15 mm binding is formed on the left edge of the image.

The processes executed by the CPU 1 are described hereinafter with a focus on processes to specify bindings relative to instruction input from the operation panel.

Figure 25:
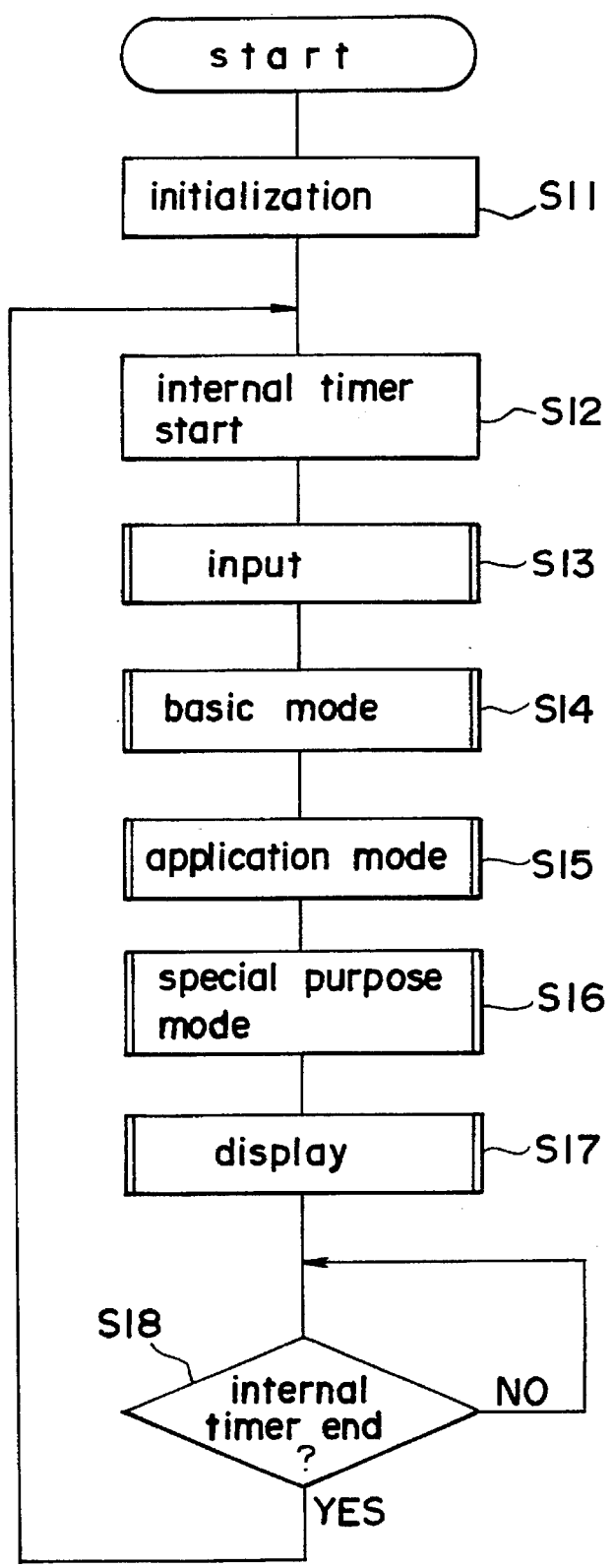
FIG. 25 is a flow chart showing the main routine of CPU 1.

FIG. 25 shows the main routine of CPU 1.

Each time the power is turned on, the processing of CPU 1 begins, and after initialization (step S11), the internal timer is managed in step S12, whereupon the processes of steps S13–S17 are repeated (step S18).

In step S13, a process is executed to detect input from the operation panel. In step S14, mode setting in the standard mode is accomplished based on the input result of step S13. In step S16, mode setting in the special purpose mode is accomplished based on the input result of step S13. The special purpose mode processes are described later with reference to FIGS. 26, and 28–30. In step S17, the results of steps S14–S17 are displayed on the LCD.

(11) Special purpose mode process

Figure 26:
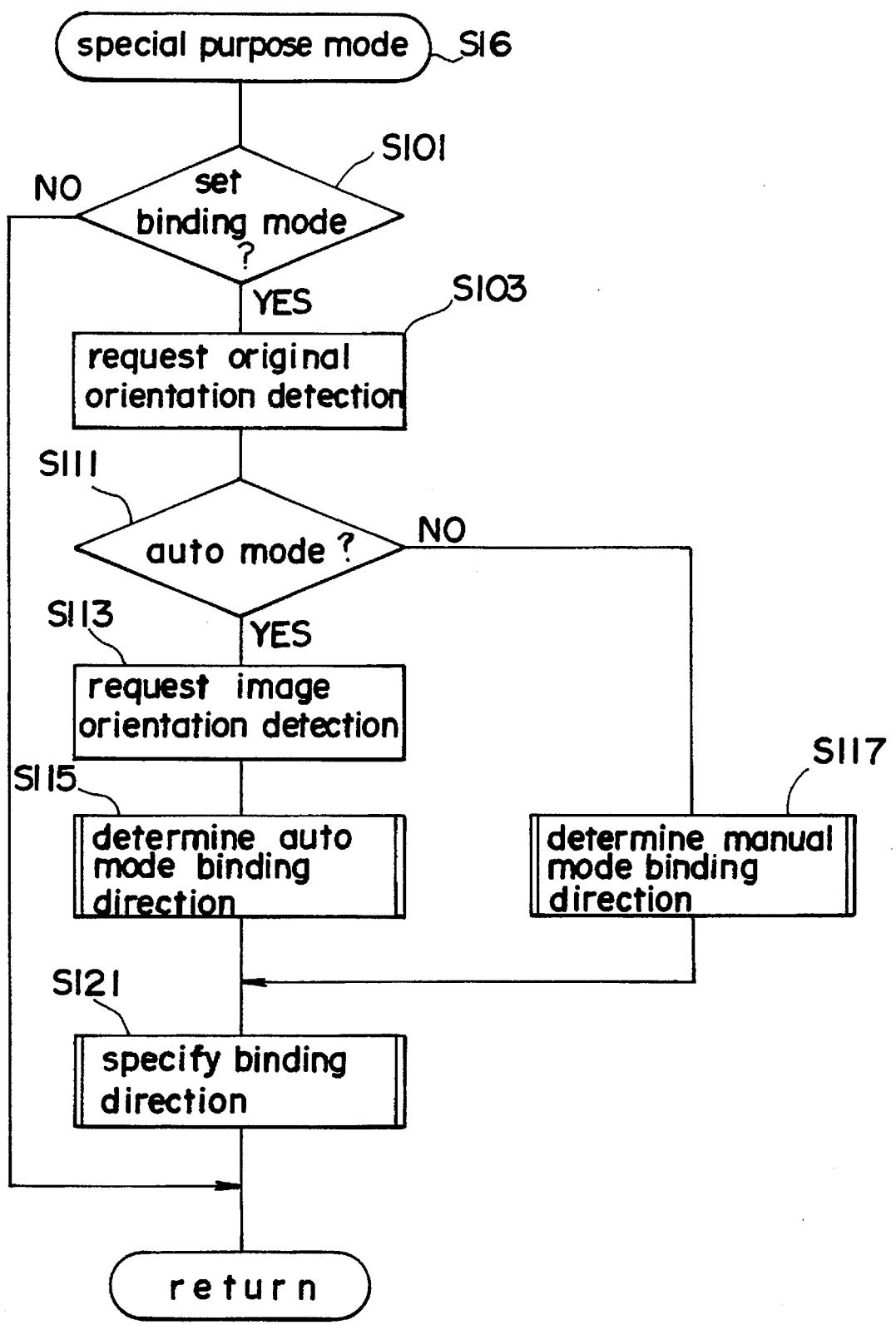
FIG. 26 is a flow chart showing step S16 of FIG. 25.
Figure 27:
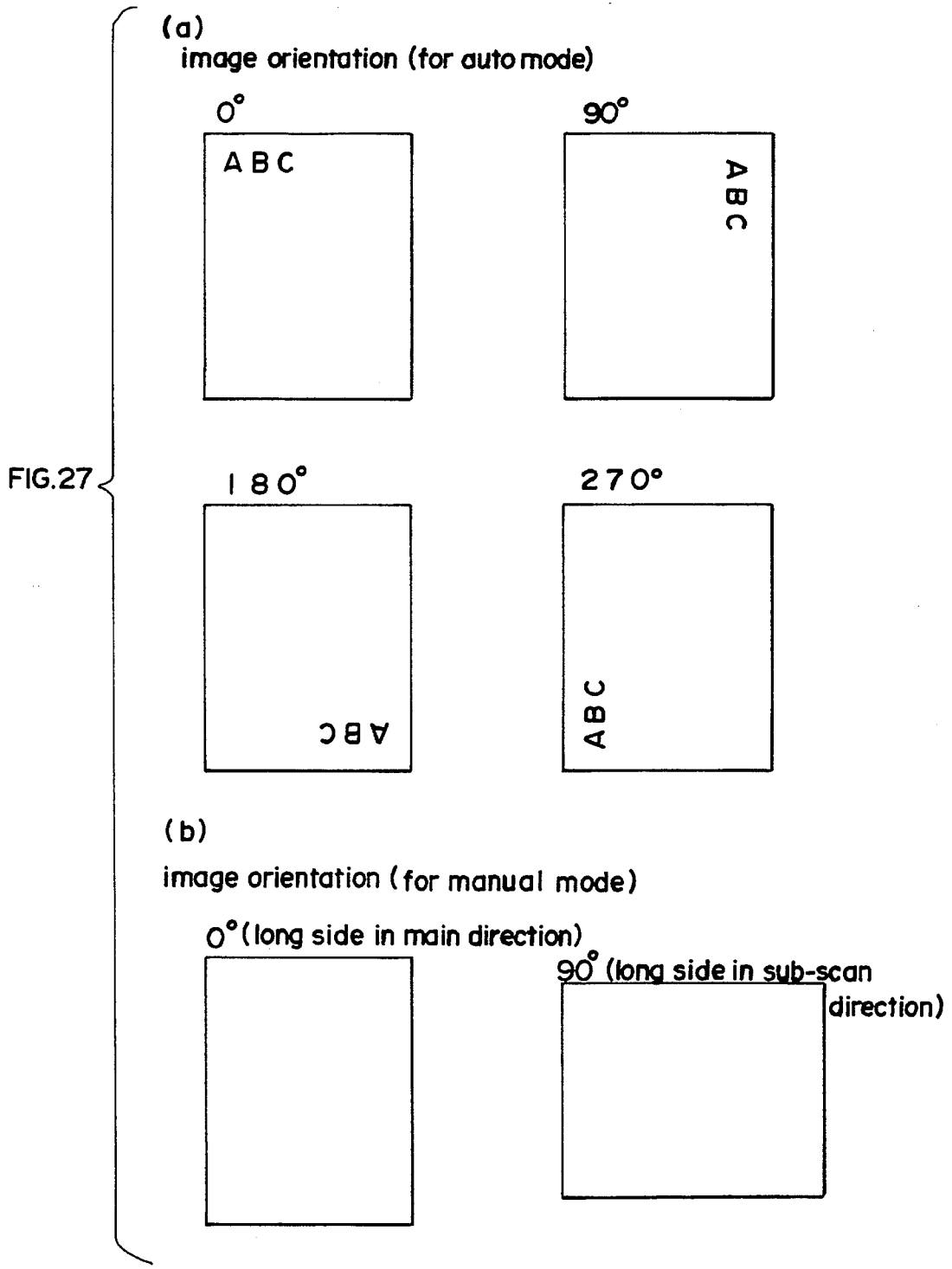
FIG. 27 is an illustration showing the image orientation and original document orientation in manual mode and auto mode.

FIG. 26 shows the special purpose mode process.

When one of the binding modes is set via the operation panel (step S101: YES), detection of the orientation of the original is requested to CPU 2 (step S103). The CPU 2 detects the orientation of the original pursuant to the aforesaid request in the manner previously described. If the set binding mode is the auto mode shown in FIG. 4 (step S111: YES), detection of the original image orientation is requested to CPU 6 (step S113). The CPU 6 detects the original image direction pursuant to the aforesaid request in the manner previously described. Then, the auto mode binding direction determination process is executed (step S115). This process sets the variable DIR which specifies the binding formation direction in accordance with the image direction detected by CPU 6 and the binding direction specified via the operation panel. This process is described with reference to FIG. 28.

If the set binding mode is the manual mode of FIG. 3 (step S111: NO), the manual mode binding direction determination process is executed (step S117). This process sets the aforesaid variable DIR in accordance with the binding direction set via the operation panel. This process is described with reference to FIG. 29.

After the auto mode binding direction determination process (step S115), or the manual mode binding direction determination process (step S117), the binding direction specifying process is executed (step S121). This process sets the binding direction in accordance with the aforesaid variable DIR previously set as described above. This process is described with reference to FIG. 30.

Figure 28:
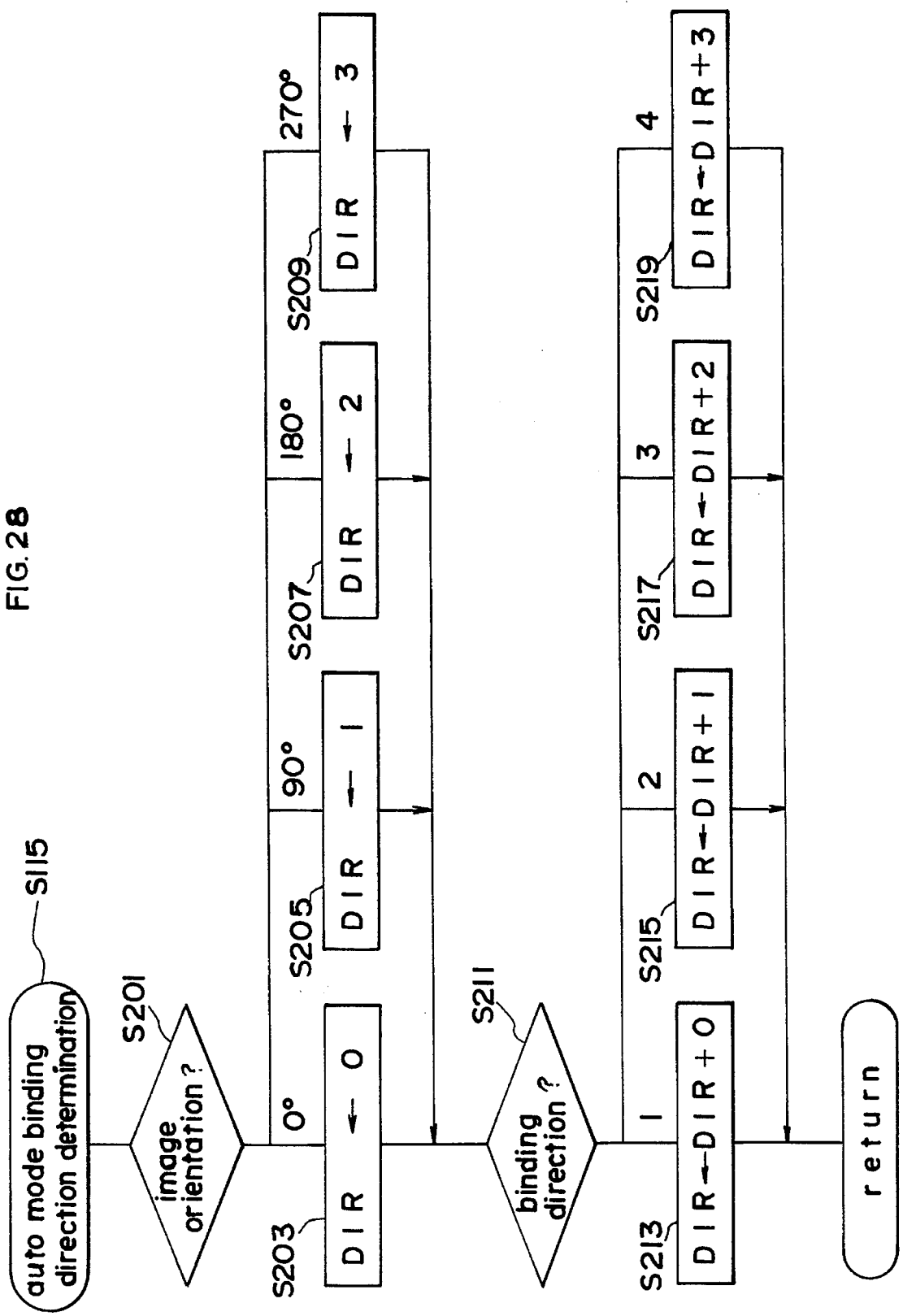
FIG. 28 is a flow chart showing step S115 of FIG. 26.

FIG. 28 shows the auto mode binding direction determination process.

Firstly, the original image direction detected by CPU 6 is determined (step S201).

If the result of the aforesaid determination, i.e., image direction, is 0°, as shown in FIG. 27a, the variable DIR is set at [0]; the variable DIR is set at [1] if the direction is 90°; the variable DIR is set at [2] if the direction is 180°; the variable DIR is set at [3] if the direction is 270° (steps S203–S209).

Then, the binding direction specified via the operation panel is determined (step S211).

If the result of the aforesaid determination is switch No. 1 (top edge) in FIG. 4, the DIR value assigned in steps S203–S209 is maintained without modification (step S213). If the determination is switch No. 2 (left edge) of FIG. 4, the DIR value assigned in steps S203–S209 is added [1] (step S215). If the determination is switch No. 3 (bottom edge) of FIG. 4, the DIR value assigned in steps S203–S209 is added [2] (step S217). If the determination is switch No. 4 (right edge) of FIG. 4, the DIR value assigned in steps S203–S209 is added [3] (step S219).

Figure 29:
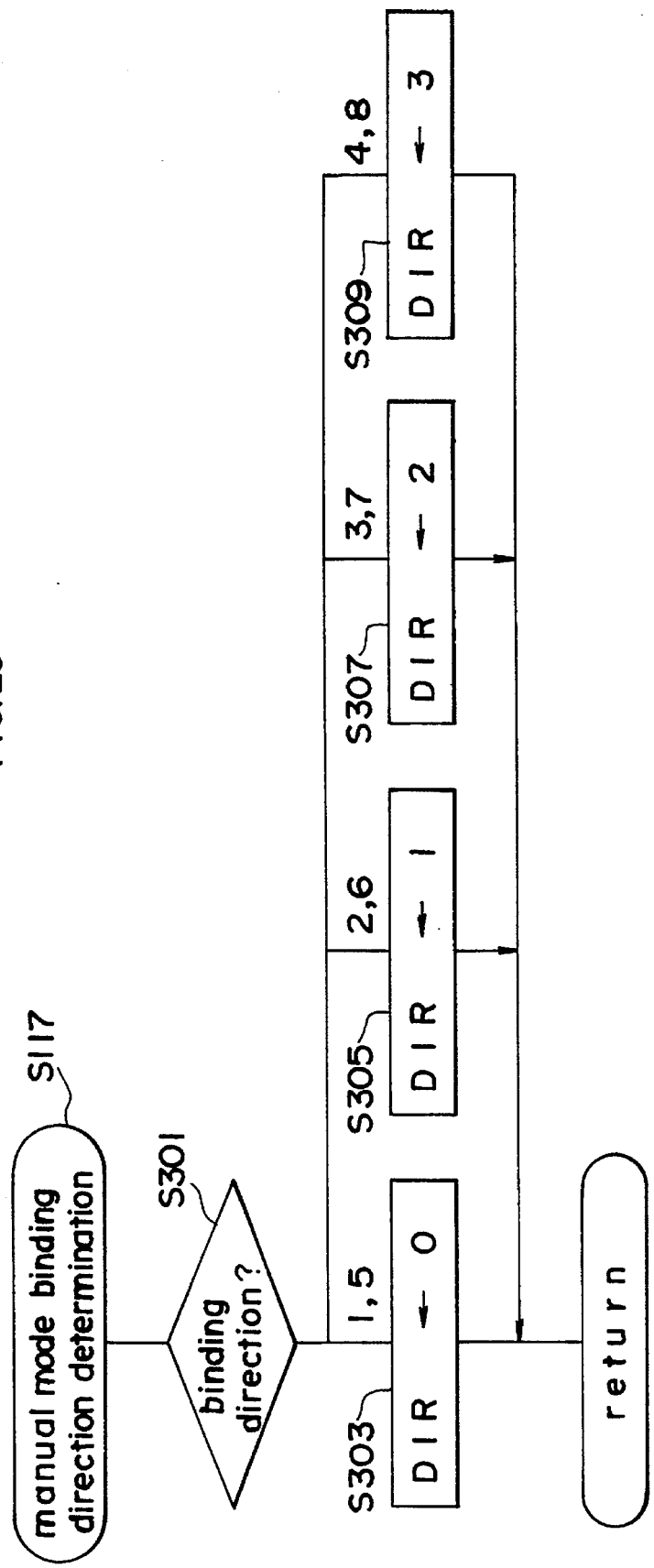
FIG. 29 is a flow chart showing step S117 of FIG. 26.

FIG. 29 shows the manual mode binding direction determination process.

Firstly, the binding direction specified via the operation panel is determined (step S301).

If the result of the aforesaid determination is switch No. 1 or 5 (top edge) in FIG. 3, the assigned DIR value is [0] (step S303). If the determination is switch No. 2 or 6 (left edge) of FIG. 3, the assigned DIR value is [1] (step S305). If the determination is switch No. 3 or 7 (bottom edge) of FIG. 3, the assigned DIR value is [2] (step S307). If the determination is switch No. 4 or 8 (right edge) of FIG. 3, the assigned DIR value is [3] (step S309).

Figure 30:
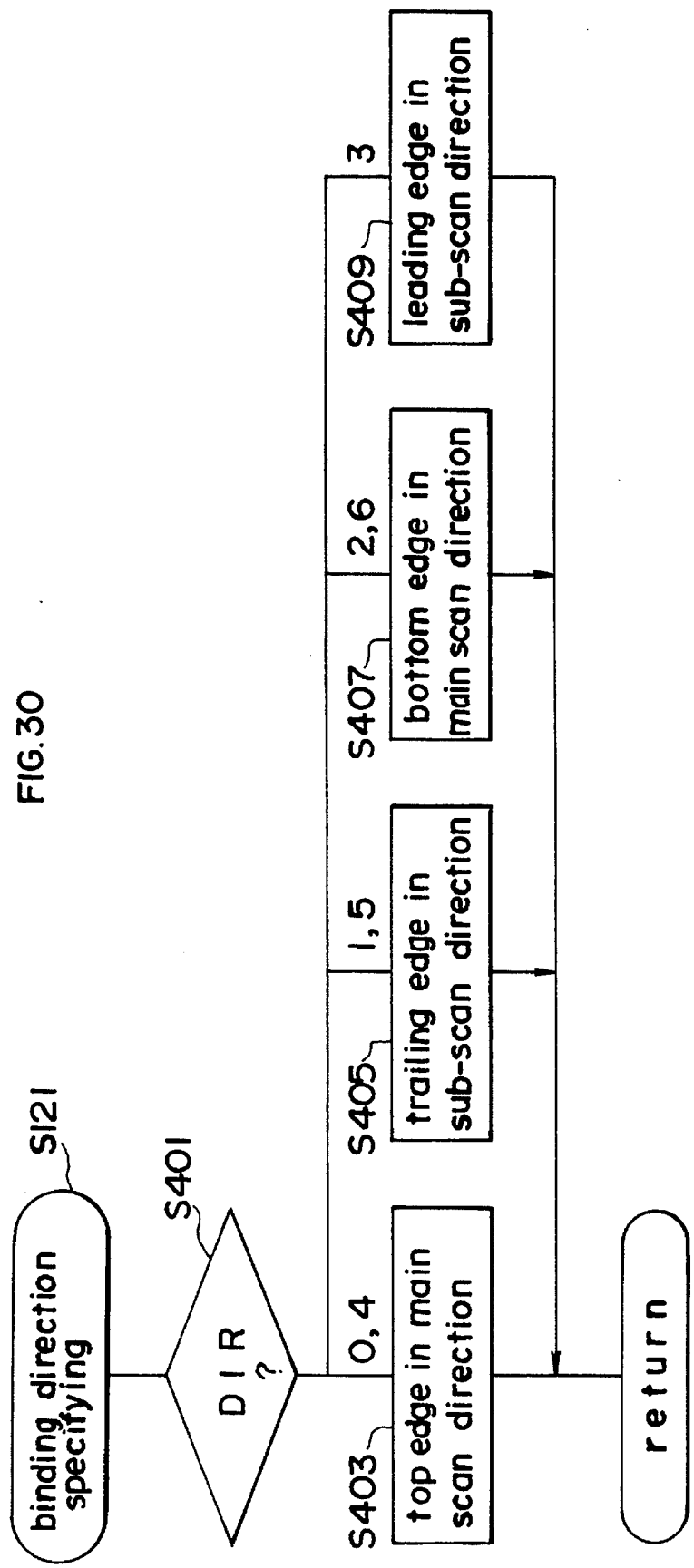
FIG. 30 is a flow chart showing step S121 of FIG. 26.

FIG. 30 shows the process for setting the binding direction in accordance with the DIR value set in FIGS. 28 and 29.

That is, the top edge of the main scan direction is set as the binding direction if the DIR is [0] (or [4]) (step S403). DIR=0 (or 4), when switch No. 1 is set on condition that the original image angle is 0°, switch No. 3 is set on condition that the original image angle is 180°, switch No. 4 is set on condition that the original image angle is 90°, and switch No. 2 is set on condition that the original image angle is 270° in the auto mode, and when switches Nos. 1 or 5 are set in the manual mode.

Similarly, the trailing edge in the sub-scan direction is set as the binding direction when the DIR is [1] (or [5]) (step S405), the bottom edge in the main scan direction is set as the binding direction when the DIR is [2] (or [6]) (step S407), and the leading edge in the sub-scan direction is set as the binding direction when the DIR is [3] (step S409). In these instances, the aforesaid six combinations also occurs as the DIR is [0] (or [4]).

When the binding direction is set, the copy image formation is controlled so as to form a binding at the set position.

That is, when the top edge of the main scan direction (or bottom edge) is set as the binding direction, the previously described FST_POS is set as shown in FIG. 12 (steps S603, S613), and the movement occurs in the main scan direction as shown in FIG. 9b.

When the left edge (or right edge) in the sub-scan direction is set as the binding direction, the timing for reading image data and the timing for feeding the copy sheet via the timing roller 82 are adjusted as shown in FIG. 13. That is, whenever a copy sheet is standing by at the position of the timing roller 82, the copy sheet is first fed from said timing roller 82 only by a length corresponding to the binding width (step S55), such that a binding is formed on the leading edge of the copy sheet in the sheet feeding direction. Alternatively, the timing by which the copy sheet is fed by the timing roller 82 is delayed relative to the timing by which the image data are read (step S57), such that a binding is formed on the trailing edge of the copy sheet in the sheet feeding direction.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A digital copying apparatus which reads an original image of an original document placed on a document platen, generates digital image data in accordance with said read image, and forms a copy image on a copy sheet based on said image data, said digital copying apparatus comprising:

a binding input device for inputting a binding position on a copy sheet as a relative position in relation to said original image;

a first detector for detecting an orientation of the original document and an orientation of the original image based on said image data;

a second detector for detecting an orientation of a copy sheet; and a controller for controlling formation of the copy image based on the orientations of the original document and original document image detected by said first detector and the orientation of the copy sheet detected by said second detector so as to provide a binding at said relative position in relation to the copy image.

2. The digital copying apparatus as claimed in claim 1 wherein said controller shifts a position of the copy image with respect to the copy sheet in accordance with the binding position inputted by said binding device.

3. The digital copying apparatus as claimed in claim 2, wherein said controller shifts the position of copy image by adjusting a timing of sending a copy sheet to an image forming position.

4. The digital copying apparatus as claimed in claim 2, wherein said controller shifts the position of copy image by changing a start position for reading out the digital image data.

5. The digital copying apparatus as claimed in claim 1, wherein said binding input device is an operation panel.

6. A digital copying apparatus comprising:

a reading device for reading an original image of an original document and generating image data;

image forming device for forming a copy image on a copy sheet based on the image data;

a binding input device for inputting a binding position on the copy sheet as a relative position in relation to the original image;

a first detector for detecting an orientation of original document and an orientation of the original image based on the image data;

a second detector for detecting an orientation of a copy sheet;

an image rotator for rotating the image data in accordance with the orientations detected by said first and second detectors so as to accord the orientations of the original image and the copy image; and a controller for controlling said image forming device so as to form a binding at said relative position in relation to the copy image when the image data rotated by said image rotator is formed on the copy sheet as the copy image.

7. The digital copying apparatus as claimed in claim 6, wherein said controller shifts a position of the copy image with respect to the copy sheet in accordance with the binding position inputted by said binding device.

8. The digital copying apparatus as claimed in claim 7, wherein said controller shifts the position of copy image by adjusting a timing of sending a copy sheet to an image forming position.

9. The digital copying apparatus as claimed in claim 7, wherein said controller shifts the position of copy image by changing a start position for reading out the image data.

10. The digital copying apparatus as claimed in claim 6, wherein said binding input device is an operation panel.

11. A method of forming a binding at a suitable position in relation to a copy image comprising the following steps of:

inputting a binding position on a copy sheet as a relative position in relation to an original image;

detecting orientations of an original document and the original image by scanning the original image;

detecting an orientation of a copy sheet;

determining a position at which the binding is to be formed in relation to the copy sheet based on the detected orientations of the original document, the original image and the copy sheet; and forming the binding at the determined position when the original image is formed on the copy sheet by shifting the copy image with respect to the copy sheet.

* * * * *